United States Patent [19]

McIntyre et al.

[11] Patent Number: 4,789,553

[45] Date of Patent: * Dec. 6, 1988

[54] METHOD OF THERMALLY PROCESSING LOW-ACID FOODSTUFFS IN HERMETICALLY SEALED CONTAINERS AND THE CONTAINERS HAVING THE FOODSTUFFS THEREIN

[75] Inventors: Deborah J. McIntyre, Palatine; Dwight E. Reed, Barrington, both of Ill.

[73] Assignee: American National Can Company, Chicago, Ill.

[*] Notice: The portion of the term of this patent subsequent to May 3, 2005 has been disclaimed.

[21] Appl. No.: 808,142

[22] Filed: Dec. 12, 1985

Related U.S. Application Data

[63] Continuation-in-part of Ser. No. 778,648, Sep. 23, 1985, Pat. No. 4,741,911, which is a continuation-in-part of Ser. No. 748,114, Jun. 24, 1985, abandoned, which is a continuation-in-part of Ser. No. 695,530, Jan. 28, 1985, abandoned.

[51] Int. Cl.⁴ .................................................. A23L 3/00
[52] U.S. Cl. ..................................... 426/325; 426/324; 426/407; 426/412; 426/268; 426/106; 426/321; 426/521; 426/131
[58] Field of Search ............... 426/407, 398, 399, 401, 426/402, 324, 325, 113, 106, 262, 268, 321, 412, 521, 131

[56] References Cited

U.S. PATENT DOCUMENTS

| | | | |
|---|---|---|---|
| 2,434,388 | 1/1948 | Brehm | 426/325 |
| 2,448,970 | 9/1948 | Ganucheau | 426/325 |
| 2,594,213 | 4/1952 | Rahn | 426/325 |
| 2,616,810 | 11/1952 | Benton | 426/325 |
| 2,627,473 | 2/1953 | Brissey . | |
| 3,038,810 | 6/1962 | Ackerboom et al. . | |
| 3,122,442 | 2/1964 | Sair . | |
| 3,232,769 | 2/1966 | Miller | 426/325 |
| 3,245,799 | 4/1966 | Matz . | |
| 3,275,451 | 9/1966 | Holstein | 426/552 |
| 3,429,711 | 2/1969 | Billerbeck et al. | 426/325 |
| 3,454,406 | 7/1969 | Alderton | 426/325 |
| 3,492,128 | 1/1970 | Brennan et al. . | |
| 3,526,521 | 9/1970 | Komarik . | |
| 3,537,867 | 11/1970 | Glasser | 426/325 |
| 3,886,296 | 5/1975 | Brooks et al. | 426/407 |
| 3,985,904 | 10/1976 | Bernotavicz . | |
| 4,011,346 | 3/1977 | Ernst . | |
| 4,262,027 | 4/1981 | Tunner et al. | 426/325 |
| 4,564,527 | 1/1986 | Bacako et al. . | |

FOREIGN PATENT DOCUMENTS

| | | | |
|---|---|---|---|
| 609562 | 11/1960 | Canada | 426/407 |
| 1071920 | 2/1980 | Canada | 426/407 |
| 128610 | 12/1984 | European Pat. Off. | 426/325 |
| 2921041 | 11/1979 | Fed. Rep. of Germany | 426/407 |
| 717335 | 10/1954 | United Kingdom | 426/325 |
| 2061693 | 5/1981 | United Kingdom | 426/325 |

OTHER PUBLICATIONS

Complete Course in Canning, 10th Ed., 1975, Canning Trade, Balt., Md., p. 335.
CRC Hndbk of Food Additives, 2nd Ed., vol. 1, 1972, CRC Press, p. 251.

(List continued on next page.)

Primary Examiner—Steven Weinstein
Attorney, Agent, or Firm—Wyatt, Gerber, Burke and Badie

[57] ABSTRACT

Low acid heat-sensitive foodstuffs, such as low acid heat-sensitive vegetables and cereal grain products, are thermally processed in the presence of a mixture of an acid and its lactones, preferably an aldonic acid with its lactones, the acid of which makes possible a considerably reduced commercial sterilizing parameter whereby more of the flavor, color, or texture of the foodstuff is retained, and is closer to that of the freshly harvested home-cooked product, compared to the foodstuff processed at a more severe parameter when the acid is not employed. The type and level of the acid employed and its presence with its lactones results in a thermally processed foodstuff which does not have an objectionable acid taste. The preferred mixture is gluconic acid with its lactones, glucono-delta lactone and glucono-gamma lactone, provided to the foodstuff by combining it with a precursor of gluconic acid, preferably glucono-delta lactone.

25 Claims, 9 Drawing Sheets

OTHER PUBLICATIONS

Technology of Food Preservation, 4th Ed., p. 156, Desrosier et al., 1977, Av, Publ. 1977.
Consumers Dictionary of Food Additives, Winter Crown Publishers, 1972, p. 115.
Fermo Biochemics/Finnsugar Brochures.
Pfizer Technical Bulletin No. 93.
Monograph on Glucono-delta-lactone.
LaBell, "Pickled Foods with Less Vinegar Offer New Flavor Possibilities", *Food Processing*, 1981.
Andres, "Lowers pH of Acidified Foods without Strong Acid Taste", *Food Processing*, 1981.
Andres, "Acidulants", *Food Processing*, May, 1985.
Sognefest et al., "Effect of pH on Thermal Process Requirements of Canned Foods", *Food Research*, 1948, vol. 13, No. 5, pp. 400–416.
*Food Manufacturer*, Sep., 1981.

METHOD OF THERMALLY PROCESSING LOW-ACID FOODSTUFFS IN HERMETICALLY SEALED CONTAINERS AND THE CONTAINERS HAVING THE FOODSTUFFS THEREIN

RELATED APPLICATIONS

This application is a continuation-in-part of U.S. application Ser. No. 778,648, filed Sept. 23, 1985, now U.S. Pat. No. 4,741,911, which in turn is a continuation-in-part of application Ser. No. 748,114 filed June 24, 1985, now abandoned, which in turn is a continuation-in-part of U.S. Ser. No. 695,530, filed Jan. 28, 1985, now abandoned.

FIELD OF THE INVENTION

This invention relates generally to the thermal processing of low acid foodstuffs and is particularly related to thermally processed, low acid heat-sensitive vegetables. By "thermal processing" is meant subjecting the foodstuff to a time-temperature parameter which results in a "commercially sterilized" food, as defined in Title 21 CFR Part 113 (Definitions, Sec. 113.3) "Commercial sterility of thermally processed food means the condition achieved—

"(i) By the application of heat which renders the food free of—
"(a) Microorganisms capable of reproducing in the food under normal nonrefrigerated conditions of storage and distribution; and
"(b) Viable microorganisms (including spores) of public health significance; or
"(ii) By the control of water activity and the application of heat, which render the food free of microorganisms capable of reproducing in the food under normal nonrefrigerated conditions of storage and distribution."

By "low acid" is meant the product in its natural state has an equilibrium pH greater than 4.6; the term also includes products to which some acid may have been added before thermal processing but in an amount insufficient to reduce the pH to below 4.6.

BACKGROUND AND OBJECTS OF THE INVENTION

There are certain foods, particularly low-acid vegetables (some of which are hereinafter enumerated) which require thermal processing for a long period of time at a relatively high temperature (protracted time-temperature processing parameter) in order to kill microorganisms responsible for food spoilage and toxicity. *Clostridium botulinum* for example produces its lethal toxin only when it has achieved the vegetative form growing under anaerobic conditions in the canned food and this possibility is prevented by the sterilizing process.

Such prolonged processing can literally ruin the texture (material consistency, integrity and firmness) and color of certain heat-sensitive vegetables such as cauliflower and melons, neither of which is presently sold in the canned form, and with respect to other of the more heat-sensitive vegetables such as sliced squash, such prolonged processing renders their texture so soft and so affects their color as to tend to render them unattractive and unappealing to many consumers. These latter processed products presently are not accepted on a general consumer level and therefore are not canned on any significant commercial scale. The vegetables just named are only part of the entire list falling into the heat sensitive category. By "heat-sensitive" is meant those food products which tend to degrade to the point where their texture, color and/or flavor is impaired when conventionally thermally processed.

From the moment of harvest, food undergoes progressive deterioration and preventative measures are often taken to prolong storage life. Food preservation techniques should retain the nutritional value and prolong the stability of the foods' organoleptic properties. By this is meant those properties or qualities of the foodstuff determinable by use of one or more of the human sense organs, the organoleptic qualities including texture, color, flavor and/or aroma.

Methods of preservation involve the application of scientific and engineering principles to control food deterioration. Modern processes to achieve food preservation are aimed primarily at controlling the growth of microorganisms. The most important means of controlling these microorganisms include heat, cold, drying, acids, sugar, salt, smoke, and curing. The following discussion will briefly describe each of these processes with the corresponding advantages and disadvantages.

Drying is one of the oldest methods of food preservation known to man. Sun drying of fruits, nuts and grains, meats and vegetables is an important method of food preservation. However, since the natural elements are unpredictable, mechanical dehydration equipment is used to maximize heat transfer into the product and afford greater control of the drying variables. Commercially used dried foods include apples, apricots, figs, prunes, raisins, carrots, potatoes, bananas, eggs, and milk. Most dried foods have excellent shelf life and are reasonbly inexpensive and, because of convenience, have widespread use in the food service industry.

By freezing a product and drying it under high vacuum conditions, it is possible to produce many dried foods of superior quality than obtained with conventional drying. Freeze drying is currently used for selected fruits and vegetables, shrimp, coffee, and special military rations. However, they are very expensive, costing much more than conventional dried foods and frozen or canned foods.

A food concentrated to 65% or more soluble solids, (largely composed of sucrose and other sugars) may be preserved by mild heat treatment provided the food is protected from the air. Examples are syrups, jams, jellies, preserves, and sweetened condensed milk. However, due to the high sugar content the preservation of foods by this method is not applicable to most foods in the human diet. Two types of such mild heat treatment are pasteurization which involves a low heat of about 130° F. to 155° F. which alone does not commercially sterilize but must be combined with a food preservative or preservation system, and hot filling which involves filling a container with a food product heated at about 180° F. to 212° F. which can only commercially sterilize certain limited high acid or high sugar foods.

When used in sufficient quantity, salt has a bacteriostatic effect by creating an environment not conducive to bacterial growth. Salt is used, to a very limited extent, for preserving fish and meat, many times with the addition of smoke, to produce a drying effect and impart a desirable flavor. In the amounts necessary to inhibit bacterial growth, salt imparts a harsh, dry, salty taste that is not very palatable, has health implications and is objectionable to many consumers.

Smoke from burning wood contains traces of formaldehyde and other chemicals unfavorable to microorganisms. In addition, smoke is generally associated with a mild heat treatment, usually effected at from about 120° F. to about 160° F. and the resulting dehydration of the food (meat and fish) contributes to its preservation. The resultant product is very dry and not very palatable. Currently, smoke is primarily used for flavor rather than preservation.

Curing is a process which involves chemically treating a meat foodstuff for preservation. While salt is basic to all mixtures for curing meat (bacon, ham, sausage, etc.) sodium nitrate and sodium nitrite have been used as part of the cure for centuries to stabilize the red color and inhibit growth of a number of food poisoning and spoilage organisms. Salts of ascorbic acid and erythrobic acid, and glucono-delta lactone (the lactone hydrolyzes to gluconic acid) are used to hasten development of and to stabilize the red color of red meat. Modern day methods of manufacturing cured meat products include mixing the curing salts with the raw ground meat emulsion (luncheon meat, sausage, etc.) or pumping the curing solution into the raw meat (ham, bacon, etc.) followed by cooking in hot water (150° F.–165° F.) to obtain an internal product temperature between 140° F. to 155° F. These mild cures currently used are not sufficient to produce shelf stable meat products and therefore the meat must be kept under refrigeration.

Microorganisms are sensitive to acids in various degrees. The preserving effect of acid is due to the hydrogen ion concentration and its destabilization effect on bacterial cells. Acids may be found in foods as a natural component, produced in foods by fermentation, or added to foods directly as a chemical. Since acid enhances the lethality of heat, acid foods (pH 4.6 or below) need only be heated generally up to about 205° F. which is much lower than the heat needed for more alkaline foods (low acid; pH above 4.6) to render them free of spoilage organisms. The acids commonly added to foods (acetic, citric, malic) create a distinct "pickled" flavor, which in many instances detracts from the natural home-cooked flavor and the foods to which they have been added are technically termed acidified.

Although not a sterilization process, low temperatures (0° F. or below) inhibit bacterial growth and enable frozen foods to be stored for several months with very little deterioration of quality or loss of nutrients. Most meats, fish, vegetables and fruits freeze well and have high organoleptic qualities. It is generally recognized that quick-frozen foods retain the color, texture and flavor of fresh vegetables better than any other food preservation method. However, because of rising energy rates, warehousing, transportation and storage, the cost of frozen foods is substantially higher than for canned food or dried food.

The process of preserving foodstuffs in sealed containers, such as "canning," dates back to 1809. Low-acid foodstuffs (as distinguished from acid foodstuffs which can be hot filled) are filled into a metal container, hermetically sealed and thereafter preserved by thermal processing at a time-temperature parameter sufficient to commercially sterilize the contents. The parameters for such low acid foodstuffs range from about six minutes to about seven hours, and from about 212° F. to about 275° F., the parameter depending upon various factors such as the type of and initial temperature of the product, the size of the container, the type of sterilization process used, the operating parameters of the equipment employed, energy costs and the through-put desired.

Prior to development of canning, foods could not be preserved, transported or stored for long periods except in the dry state. Canned foods were the first "convenience" foods. Today's canned foods are not only convenient and nutritious, but are the least expensive compared to other ready-to-serve foods preserved by freezing or any other means.

To successfully preserve most foods, sufficient heat is required to render the food free of viable microorganisms having public health significance, as well as any other microorganisms of nonhealth significance capable of reproducing in the food under normal storage conditions. The amount of heat and time required to commercially sterilize low acid canned foods usually alters and is sometimes damaging to flavor, texture and color compared to the fresh product. Therefore, any treatment that can be made to the food to reduce the time or temperature necessary for sterilization is desirable since it will generally improve quality. Aseptic canning and rotary agitated cookers are examples of equipment which provide high temperature-short time commercial sterilization and, therefore, improve quality. Heretofore, in general, commercial sterilization times and temperatures for low acid foods were from ten minutes to six hours at from about 230° F. to 270° F. These times and temperatures are selectable and vary as pointed out above.

The amount of heat necessary to sterilize acid or acidified foods (pH 4.6 or lower) is substantially less than required to sterilize low acid (above pH 4.6) foods. The amount of those acids commonly added to foodstuffs which would be required to acidify foods to pH 4.6 or below, would impart a distinct, sour (vinegary) flavor which would render many products unacceptable.

In spite of all the food preservation processes known to mankind there are some heat-sensitive products, especially certain vegetables, delightful to the taste and quite nutritious in the home-cooked form, which are not available at all as thermally processed products in cans, or as such are available only in a quality which has not obtained general consumer acceptance because of lost texture, degraded color or poor flavor, especially low acid, heat-sensitive vegetables.

One approach to the problem of degradation of the color of foodstuffs has been to treat them with chemicals. For example, sulfiting agents such as sulphur dioxide, sodium and potassium bisulfite, sodium and potassium metabisulfite and sodium sulfite, have been successfully used for controlling or reversing discoloration of a wide variety of low acid foodstuffs, including fruits and vegetables, potatoes, hominy, mushrooms and soup mixes. However, the use of these sulfiting agents has not been without problems. They tend to produce sulfurous odors and flavors, and though they heretofore have been generally regarded as safe, recently, they have been implicated as potential health hazards, for example as initiators of asthmatic attack and other adverse reactions in sensitive people. Also, the sodium containing agents are contraindicated with respect to hypertensive individuals. Most significantly, the Food and Drug Administration of the United States Government has recently proposed to amend the regulations governing sulfiting agents to prohibit their use in connection with potatoes, and to require label declaration of uses of 10 ppm or more for foodstuffs intended to be served or sold to the public. Because of their wide usage and the general lack of acceptable alternatives, the banning of sulfiting agents would have a direct and severe impact on food processors and on the appearance of the foods they process, pack and sell. Other agents which control discoloration but are not generally considered as acceptable alternatives are the previously described food grade acids such as acetic, citric and malic, which impart a distinct pickled, sharp or acidic flavor to the food, and sodium pyrophosphate which tends to render the food mealy, thereby adversely affecting its texture.

One of the most common and effective applications of sulfiting agents has been in controlling, that is, preventing, inhibiting, retarding or reversing discoloration of potatoes and other foodstuffs which are prone to enzymatic and/or oxidative discoloration. Discoloration of these foodstuffs, say potatoes, begins when they are harvested, and accelerates when their skin is damaged or when they are peeled, cut or sliced, thereby injuring the cells and exposing them to air. This initial discoloration is probably exclusively enzymatic in nature. Oxidative discoloration which begins upon exposure to air continues after the enzymes have been inactivated by processing such as by blanching, frying or cooking. With potatoes, oxidative discoloration appears to be associated principally with oxidation of a ferrous ion complex with o-dihydroxyphenols to form the colored complex with ferric ion.

Because of the widespread desire to control discoloration of foodstuffs, the aforementioned serious disadvantages and now the likely banning of sulfiting agents, there is great interest and need for the discovery of an acceptable alternative to sulfiting agents, especially for foodstuffs which are highly susceptible to discoloration such as potatoes and potato products. Satisfactory, non-toxic agents for controlling discoloration of these foodstuffs are difficult to develop, among other reasons, because of their highly complex nature, the rate at which they discolor and their relatively bland flavor which does not mask deleterious flavors of added agents.

In accordance with the present invention, combining a low acid heat sensitive foodstuff with a mixture of an aldonic acid with its lactones, preferably gluconic acid with its lactones, by the addition to a low acid foodstuff of the aldonic acid or an aldonic acid precursor, preferably one of its lactones, to achieve a pH of 4.6 or lower, enables the low acid, heat-sensitive foodstuff to be commercially sterilized or canned to achieve shelf stability while exhibiting flavor, texture, and/or color closer to the natural or fresh product, very similar to the fresh, home-cooked product, and without the typical pickled, sharp, pungent, or acid flavor associated with acids commonly used in foods. Moreover, when a foodstuff is sterilized in a metal container internally coated with a suitable enamel, in accordance with the process of this invention, the result is considerably less internal corrosion and iron pick-up from the metal container than experienced with other acids employed in foods. Additionally, the results are much less impairment of the natural flavor and longer acceptable shelf life.

The combining of the low acid foodstuff with the acidulant of this invention, e.g. the mixture of the aldonic acid and its lactones, to reduce the pH to 4.6 or below prior to, during, or immediately after thermal processing preferably is accomplished in one step, most preferably by including the acid/lactone mixture in the brine or syrup present with the foodstuff in the container to be thermally processed. It can also be effected in multiple steps, for example, in two steps, first by initially treating or contacting, e.g. by washing, dipping, soaking, etc. the foodstuff with the mixture before thermal processing, e.g. after harvesting and preferably before noticeable or unacceptable discoloration begins, to prevent, inhibit, retard or otherwise control discoloration and to reduce the pH of the foodstuff to a level closer to but above 4.6, and then by using an amount, preferably a relatively small amount, of the acid/lactone mixture in the brine during thermal processing to further reduce the pH of the thermally processed container contents to 4.6 or less.

A primary object of the present invention is to enable low acid, heat-sensitive foodstuffs to be thermally processed at a reduced parameter whereby flavor, texture or color (or any combination of these) is closer to the natural or fresh product and is more nearly that of the natural, home-cooked product than heretofore. The dietitian's meaning herein is given to "home-cooked," namely that the foodstuff is cooked until just tenderized, to be more edible, while maintaining near maximum nutrient content.

Another primary object of the present invention is to be able to shift the thermal processing parameter for low acid, heat-sensitive foodstuffs from a high value to a lower value (meaning a lower temperature for the same time or the same temperature for less time, or both lower temperature and less time) whereat texture and/or color is not drastically altered or impaired, while at the same time the natural flavor is substantially retained, for example by not being masked by the taste of another substance such as the pronounced, sharp taste of strong acids such as vinegar and citric acid, or by avoiding the carmelized flavor resulting from long cooking times.

Another main object of this invention is to provide a method for thermally processing low acid foodstuffs in the presence of an acid with its lactones, preferably an aldonic acid with its lactones in a container, wherein the presence of the acid lowers the equilibrium pH of the contents to 4.6 or below and thereby reduces the severity of processing parameter and improves the flavor of the thermally processed product as compared to that of the same product thermally processed without the acid, and the mildness of the aldonic acid, the level employed and presence of the one or more lactones with the acid softens or modifies the taste of the acid and permits the flavor of the thermally processed contents to be significantly less acid-tasting and significantly improved relative to that of those acis such as for example acetic, citric, lactic, malic, phosphoric and tartaric, commonly employed in foodstuffs.

A related object is to enable any of the foregoing objectives to be accomplished by thermally processing the low acid foodstuff in combination with an equilibrium mixture of gluconic acid and its lactones, glucono-delta lactone and glucono-gamma lactone, the mixture being employed in an amount sufficient to produce an equilibrium pH of 4.6 or lower, where the spores of *C. botulinum* will not germinate and grow to the toxic vegetative form.

Another object is to utilize the acidulant of this invention which is combined with the foodstuff, to control discoloration of to-be-thermally processed low acid foodstuffs, e.g. potatoes, which are prone to discoloration due to enzymatic and/or oxidative degradation, or due to thermal degradation during thermal processing.

Another related object of this invention is to utilize the acidulant of this invention as an acceptable, safe-for-human-consumption substitute for sulfiting agents for controlling discoloration of such foodstuffs.

A related object is to combine the acidulant of this invention with the foodstuff to be thermally processed, in two or more steps, the first, or pretreatment step, preferably soon after peeling, cutting or slicing to prevent, retard, inhibit, reverse or otherwise control discoloration before thermal sterilization and reduce the pH of the foodstuff and the second step, to reduce the equilibrium pH of the foodstuff to 4.6 or below just prior to, preferably during or just after thermal processing.

Another object is to achieve the above-mentioned advantages of a multi-stage combining step while still achieving the reduced thermal processing parameter and flavor advantages of the invention.

Another object is to utilize the acidulant of this invention in combination with foodstuffs in accordance with the method of this invention prior to and/or during thermal processing to provide cooked foodstuffs which are resistant to discoloration.

Another advantage and related object of the invention is to achieve a brine (liquid content) which, after thermal processing, is more clear than the brine ordinarily achieved. Since the present invention makes possible reduced processing parameters, another advantage and related object of the invention is that more product substance and nutrients are retained instead of being lost into the brine during processing and storage. Thus, the brine is clearer and the drained weight of the canned product is increased.

Another object of the invention is to enhance the nutrient value of the food product; thus, since the food product has a lower processing parameter, greater amounts of heat-sensitive nutrients are retained in the food.

Another object of the invention is to be able to reduce corrosivity and iron pick-up when thermally processing foodstuff in accordance with the present invention compared to thermal processing of an acidified food when using a conventional acid such as acetic acid (vinegar).

SUMMARY OF THE INVENTION

The invention may be summarized by reference to the drawings which show the shift in the thermal processing parameter for several low acid food products processed under the present invention using the preferred precursor of an aldonic acid, glucono-delta lactone (GDL). The curve to the right in each instance represents processing parameters when the food product is sterilized at its natural pH without employing glucono-delta lactone, i.e. without combining the foodstuff with the mixture of an aldonic acid and its lactones. The time-temperature requirement is so severe that generally the product exhibits a softened texture, and/or discoloration. By adding glucono-delta lactone to achieve an equilibrium pH of 4.6 or below, the requirement shifts to the left hand curve which represents considerably lower parameters. When foodstuffs are processed according to this invention, the texture and/or color of many foodstuffs is substantially that of the freshly harvested, home-cooked product. In most cases the flavor more closely resembles that of the natural or fresh product than that obtainable by conventional commercial thermal processing done without GDL. By combining the foodstuff with an aldonic acid and its lactones, the color of some foodstuffs can be controlled, the taste of the thermally processed foodstuff is significantly less acid and significantly improved as compared to the taste of a food product thermally processed whether at the more severe or at the reduced parameter, in the presence of only an acid, i.e. an acid which does not form lactones such as, for example, the ones commonly used in foodstuffs.

The preferred acid/lactone mixture is an aldonic acid/lactone mixture, most preferably gluconic acid with its corresponding lactones glucono-delta lactone and glucono-gamma lactone. Preferably, the mixture is brought into combination with a low acid foodstuff by combining the foodstuff with the precursor glucono-delta lactone. In contact with water in the foodstuff, the GDL hydrolyzes to an equilibrium mixture of gluconic acid and its lactones. Preferably, the GDL is added to the aqueous solution, e.g. brine or syrup, which is combined with the foodstuff in the container to be processed. The GDL or mixture can also be combined with the foodstuff in multiple steps.

DETAILED DESCRIPTION OF THE INVENTION

Figure 1:
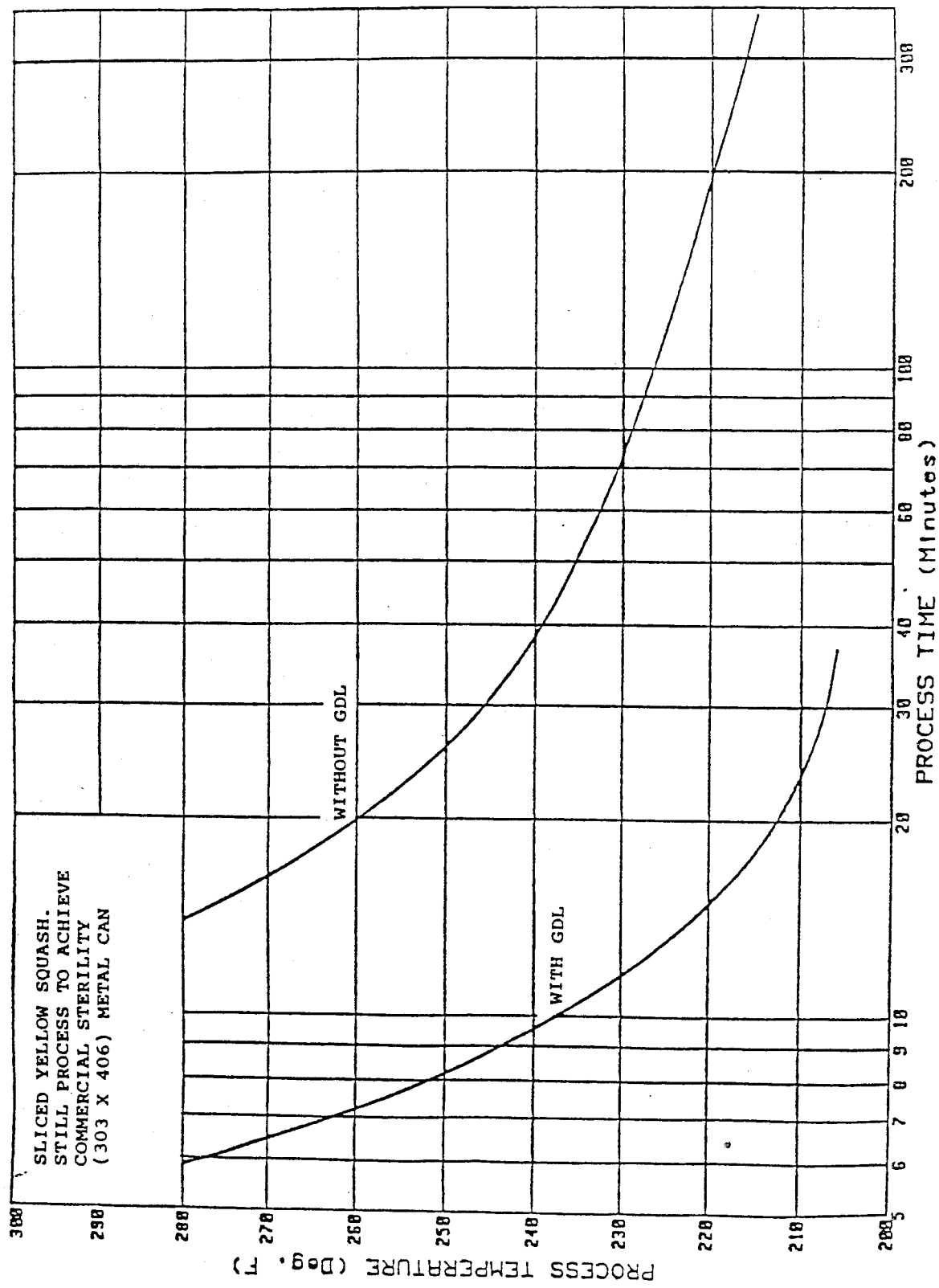
FIGS. 1 through 7 each show representative parameter curves for thermally processing a low acid heat-sensitive vegetable to commercial sterility, the curve to the right showing conventional parameters without acidification, i.e. without GDL, the curve to the left showing parameters obtainable by using the precursor GDL in accordance with this invention.

In accordance with the present invention, a variety of foodstuffs heretofore not widely available in canned form can be made generally available to consumers. Heretofore such canned foodstuffs, when available, were not widely accepted because of changes in texture, color and/or flavor.

It has been discovered that by combining a mixture of an aldonic acid and its lactones with low acid foodstuffs to be thermally processed, not only is the time-temperature parameter required for commercial sterilization of the processed product considerably reduced so that the flavor, color and texture of the foodstuff do not suffer the degradation experienced at the higher parameter needed when the acid is not present, e.g. the overcooked ("caramelized", i.e., burnt sugar) flavor is substantially eliminated, but also the levels and mild taste of the acid and the presence of the acid with its lactones results in a thermally processed foodstuff that does not have the objectionable pungent, sharp, acidic or pickled flavor notoriously characteristic of those acids used in foods, e.g. acetic, citric, lactic, malic, phosphoric and tartaric. The amount or level of aldonic acid present is that which is sufficient to assure that the equilibrium pH of the contents is reduced to 4.6 or below, preferably to an equilibrium pH of 4.3 to 4.6.

The aldonic acids which can be combined with the low acid foodstuff in accordance with this invention are prepared for example by oxidation of sugars or aldoses, preferably from those having six carbon atoms, although they could be prepared from those having five carbon atoms. Those acids prepared from sugars having six carbon atoms are talonic, galactonic, idonic, gluonic, mannonic, gluconic, altronic and allonic (although currently these acids, with the exception of gluconic, may be unavailable commercially). These acids are respectively derived from their aldoses—talose, galactose, idose, gulose, mannose, glucose, altrose and allose. Sugars having five carbon atoms are lyxose, xylose, arabinose and ribose. Those skilled in the art will understand from this disclosure regarding six and five carbon atom aldonic acids, that other acids which form their own lactone(s) and mixtures of other acids and their lactones, which perform the same functions and objectives of this invention, particularly regarding lowering the pH and regarding lack of an objectionable acid taste in the processed foodstuff, would be within the scope of this invention.

Any suitable method or material can be employed to bring the aldonic acid and its lactones into combination with the low acid foodstuff. While the acid might be added by itself (since the acid, when in contact with moisture or water in the foodstuff, will be converted to a mixture of the acid and its lactones), doing so currently does not appear practical since aldonic acids are not known to Applicants to be commercially available in crystalline form or in food grade. This is the case with the preferred gluconic acid. These acids may be commercially available in technical grade in aqueous solutions. For example, gluconic acid is so available in aqueous solutions stated to be about 50% (by weight) gluconic acid. These aqueous solutions of the acid are equilibrium mixtures of gluconic acid and its lactones, glucono-delta lactone and glucono-gamma lactone. Gluconic acid has a mild acid taste.

The preferred method for providing the aldonic acid and its lactones to the foodstuff is to combine the foodstuff with a precursor of the aldonic acid. A precursor of the acid herein means a liquid, material or compound which adds the acid to, or forms or provides it in the low acid foodstuff with which it is combined. Again, when the acid contacts moisture or water in or of the foodstuff, it will convert partially to and will co-exist with its lactones. Precursors of these acids which can be employed include their lactones themselves (which can be said to be latent acids since they hydrolyze in water to form a mixture of the acid and its lactones), mixtures of these lactones, and salts of the acids in combination with certain strong acids. For example, precursors of the preferred gluconic acid which can be employed include glucono-delta-lactone, glucono-gamma lactone, mixtures of these lactones, and gluconate salts in combination with the strong acid, hydrochloric. By far, the most preferred precursor for this invention is glucono-delta lactone (GDL). It is commercially available in food grade as a free-flowing, odorless, white powder. It has a sweet taste. Food grade solutions of GDL are also commercially available and can be employed. GDL is an inner ester of gluconic acid which when hydrolyzed forms gluconic acid. Hydrolysis occurs when GDL is combined with water, for example that of an (aqueous) brine or in the low acid foodstuff. Hydrolysis of the glucono-delta lactone results in an equilibrium mixture of from about 55% to about 60% (by weight) gluconic acid and from about 45% to about 40% (by weight) of a mixture of glucono-delta lactone and glucono-gamma lactone. The rate of acid formation during hydrolysis is affected by the temperature, the pH value and concentration of the solution. Hydrolysis of delta lactones tends to be more rapid than hydrolysis of gamma lactones. In the absence of heat, hydrolysis tends to be slow. Heating the brine accelerates the hydrolysis reaction and is the preferred method. Heating the foodstuff also has the same effect. Like results would be expected to occur with the use of lactones of other aldonic acids, e.g. galactono-delta lactone. For this invention, rapid hydrolysis through heating is preferred to help acidify the particulate foodstuff rapidly and thoroughly.

Examples of those salts which can be used in combination with certain strong acids (each suitable for food use), include sodium, potassium and calcium salts, for example, sodium, potassium and calcium gluconates. An Example of an acid considered herein to be "strong" is one which will react with the acid salt and provide enough available hydrogen ions to form the desired aldonic acid and its lactones in the low acid foodstuff. Such an acid would be hydrochloric. Of course, the type, manner and/or amount of strong acid(s) employed should be such that in accordance with the objectives of this invention, a sharp, strong or objectionable acid taste is not imparted to the low acid foodstuff. If hydrochloric acid is used as the strong acid, all of it should be converted so that no such acid would remain, only some derived salt.

Practice of the present invention will now be demonstrated by the following illustrative examples using the preferred precursor, GDL, with different low acid foodstuffs. Except as otherwise indicated the foodstuff in each instance was contained in two-piece metal cans $303 \times 406$ (that is 3-3/16 inches diameter, 4-6/16 inches high) lined with an organic polymer coating of commercial form. All pH values are at equilibrium. The cans were opened within a week after thermal processing, and at this time the two products, processed differently, were compared.

By equilibrium pH is meant the negative log of the hydrogen ion concentration of the blended product, taken in accordance with CFR 114.80(a)(1),(2) and CFR 114.90, each incorporated herein by reference, but in any case taken not more than 24 hours after completion of the thermal process, i.e. when the application of heat is terminated.

Salt for flavoring, in identical amounts or equivalent concentration for the size of can and fill weight, need not have been but was added for each vegetable compared. Salting does not feature in the invention. The fill weights were always the same for the two products to be compared.

Example 1

Sliced yellow squash is commercially canned on a limited scale in the U.S.A., particularly in the southern region, by thermal processing at about 240° F. for about forty minutes or at an equivalent time-temperature sterilizing parameter. The product, however, has poor texture (soft or "mushy"), is dark in color and has an overcooked or caramelized flavor. Consequently, the product has not attained wide consumer acceptance.

In a series of tests, freshly harvested yellow squash was conventionally washed and sliced, each slice approximately one-half inch thick, and blanched for five minutes in water at about 200° F. (a conventional treatment primarily to stop enzyme action) followed by a cold water rinse to terminate the blanch. A series of cans were packed with the blanched, sliced yellow squash (11.6 oz. fill weight), a 75 grain salt tablet was added, and some of the cans were filled with a brine which was a solution of GDL sufficient to lower the equilibrium pH to below 4.6, namely to 4.3. (See GDL Sample, Table I). Specifically, the solution of GDL was 28.6 grams GDL added to three liters of water. The brine (but without GDL) was added to other of the cans (See Reference Sample cans, Table I). This brine solution, and the other as well, was heated to 190° F. before being added to the cans. Heating the GDL brine reduces the time needed to hydrolyze the GDL to gluconic acid and its lactones, and therefore reduces the time to lower the pH to the desired level. Although it is not necessary to heat the GDL brine, heating it is the preferred commercial practice.

All cans were hermetically sealed and thermally processed. The GDL Sample cans were processed in accordance with this invention to achieve commercial sterilization in a still retort at about 220° F. for fifteen minutes. The resulting thermally processed yellow squash exhibited a firm texture and bright yellow color comparable to the home cooked product. The squash did not exhibit the soft texture and darkened color of the Reference Sample squash which was commercially sterilized conventionally at 240° F. for forty minutes without GDL addition.

This Example demonstrates that the addition of GDL to the squash to be canned (contained) permits a reduction in the severity of the thermal process to achieve commercial sterilization of the contents, in that the thermal processing temperature as well as time are significantly reduced. The scope of the change can be appreciated by reference to FIG. 1. The curve on the left represents the sterilizing conditions inside the retort to achieve a can center temperature (CCT) of 205° F. equivalent to a calculated $F_o$ of 0.02 for commercial sterilization of the sliced yellow squash of the GDL sample cans under the present invention. The curve on the right is calculated to give the retort conditions needed to achieve a sterilizing value ($F_o$) of 3.7 to commercially sterilize this yellow squash when GDL is not used. The states of sterilization achieved by the two curves in FIG. 1 are identical; the parameters, however, are considerably different, being considerably more severe along the right-hand curve. The shift in the conventional parameter on the right to the GDL processing parameter on the left is such that the time factor of the conventional parameter has been displaced (reduced), for this vegetable, for example, at about 220° F. by more than three hours.

The temperature/time parameters of each curve to the right in the present figures are based upon a particular sterilizing value ($F_o$) for the particular product which value here is basically a time equivalent calculated at 250° F. Particular $F_o$ values required to achieve commercially acceptable shelf-stable sterility are highly variable depending upon type and size of the container, type and size of food product, acidity of the product and the like. Reference is directed to the publication "Calculations of Processes for Canned Foods" (copyright 1967, American Can Company, which is an American Can Company Technical Services Publication), for further information on this matter and how $F_o$ values are derived by those skilled in the art. The higher the $F_o$ value, the greater the severity of the thermal process. Generally speaking, the lower the pH the less severe the heat treatment required for thermal sterilization.

Those skilled in the art of thermally-processing foodstuffs whose heating characteristics have been established can determine by known calculations (available in the aforementioned publication) a sterilizing value (CCT) which will achieve commercial sterilization for the product in question and the type of retort or process to be employed. For products which heretofore never have been commercially sterilized and canned or for which no heating characteristics have been developed, it is recommended that an established thermal processing authority such as the assignee of this invention be consulted to obtain a sterilizing value (CCT) which will achieve commercial sterilization for the equilibrium pH of the particular product contents to be processed. For all products whose equilibrium pH has been lowered to 4.6 or below, a CCT of 205° F. can be employed for commercial sterility. Should it be desired to use a CCT of less than 205° F. an aforementioned authority should be consulted to determine whether the lower CCT temperature would be sufficient to obtain commercial sterility.

The can or container center temperature (CCT) is determined by implanting a thermocouple into the container prior to its being hermetically sealed and tested. CCT herein means the temperature at the slowest heating point of the food product in the container which, depending on the food product, may be but is not necessarily the actual center point of the container.

Table I below is a comparison of the present invention, exemplified above, with the conventionally practiced thermal processing of sliced yellow squash (Reference Sample) which is about 240° F. for forty minutes to achieve commercial sterilization.

TABLE I

|  | Reference Sample | GDL Sample |
|---|---|---|
| Thermal processing temperature, °F. | 240 | 220 |
| Thermal processing time, minutes | 40 | 15 |
| pH of squash in the can | 5.6 | 4.3 |
| Texture (canned product) | Very soft | Firm |
| Color (canned product) | Dark yellow | Bright yellow |
| Flavor | Caramelized | Near fresh home-cooked |
| Brine clarity (drained) | Slightly cloudy | Clear |

Table I shows that under this invention the temperature displacement is a reduction of about 20° F.; the time displacement is twenty-five minutes (40 vs. 15) amounting to a reduction of 62.5% in processing time required for commercial sterilization.

Example 2

The method of preparation of the GDL Sample cans of Example 1 was repeated using zucchini, washed and sliced to one-half inch slices, blanched for five minutes and rinsed with cold water to stop the blanch. Twenty-three grams of GDL were added to two liters of water and heated to about 190° F. A salt tablet (75 grains) was added to each of a series of cans which contained the slices of zucchini (fill weight of 11.6 ounces). Some of the cans were filled with the GDL (brine) solution at about 190° F., resulting in the contents having a pH less than 4.6, i.e. 4.3 (the GDL Sample cans of Table II). The brine added to the Reference Sample cans was the same except for the absence of GDL. Processing conditions and comparisons of the resulting products are shown in Table II below.

TABLE II

|  | Reference Sample | GDL Sample |
|---|---|---|
| Thermal processing temperature, °F. | 240 | 220 |
| Thermal processing time, minutes | 40 | 15 |

TABLE II-continued

|  | Reference Sample | GDL Sample |
|---|---|---|
| pH of zucchini in the can | 5.6 | 4.3 |
| Texture (canned product) | Very soft | Firm |
| Color (canned product) | Olive green | Olive green |
| Flavor | Caramelized | Near fresh home-cooked |
| Brine clarity (drained) | Slightly cloudy | Clear |

Figure 2:
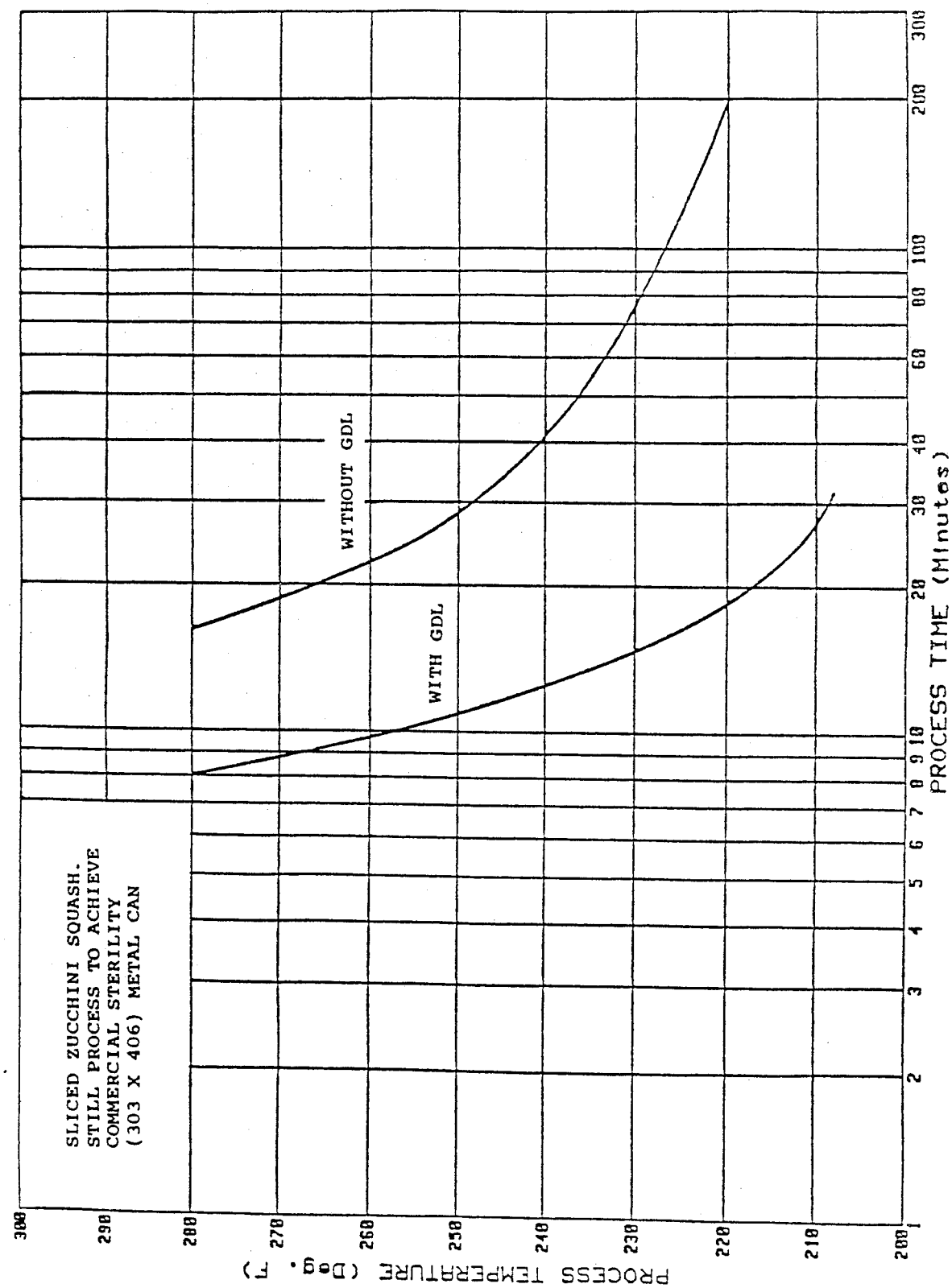

Again, by reference to FIG. 2, the economics and other advantages attendant to the lower (GDL) parameter ($F_o$, 0.02) can be readily visualized in comparison to the curve on the right ($F_o$ 3.7) which applies to the conventional still retort process practiced without GDL. Thus, for example, zucchini with GDL incorporated in the brine, together having an average initial temperature of 100° F., can be commercially sterilized at about 220° F. in about fifteen minutes but the conventional process at this same initial and retort temperature requires about three hours and twenty minutes.

From Table II it is noted that as in the case of squash, the zucchini thermally processed by the method of this invention exhibits improved texture properties as compared to zucchini samples processed without GDL. Furthermore, zucchini is possible on the store shelf today in cans only in formulations with tomatoes combined therewith to achieve a pH of 4.6 or lower. The tomato content tends to mask the zucchini taste. This invention allows zucchini to be packed and sold without a tomato ingredient and with a flavor near that of the fresh home-cooked product.

This example also serves to demonstrate that for green vegetables, GDL does not necessarily aid in retaining natural color. This is because of the well known degradation of the green colored chlorophyll under conditions when the pH is below 7. However, it is to be noted that the color of the zucchini of Example 2 was not degraded relative to the color of the Reference Sample which was olive green.

Example 3

The method of Example 2 was repeated using carrots which were peeled, washed and sliced to less than one-quarter inch thick slices. The sliced carrots were then blanched in water for about four minutes at about 190° F., followed by a cold water rinse to stop the blanch. Twenty-seven grams of GDL were then added to three liters of water and heated to about 190° F. to make the GDL brine. A 75 grain salt tablet was added to each of the cans which had been filled with the sliced carrots (fill weight 10 ounces). The GDL Sample cans were then filled with GDL brine. The brine added to the Reference Sample cans was likewise heated and was the same except for the absence of GDL. The cans were then hermetically sealed and thermally processed. The resulting product thermally processed by this invention (GDL Sample Cans, Table III) was compared with canned carrots thermally processed without GDL (Reference Sample cans, Table III). The results are presented in Table III below.

TABLE III

|  | Reference Sample | GDL Sample |
|---|---|---|
| Thermal processing temperature, °F. | 240 | 220 |
| Thermal processing time, minutes | 30 | 11.0 |
| pH of carrot slices | 5.3 | 4.1 |
| Texture (canned product) | Soft | Firm, crisp |
| Color (canned product) | Darkened orange | Bright orange |
| Flavor | Caramelized | Near fresh home-cooked |
| Brine clarity (drained) | Slightly cloudy | Clear |

Once again, as shown in Table III, the carrots which have been thermally processed in accordance with the present invention are superior, in texture, color, and/or flavor compared to carrots which have been thermally processed without the use of GDL.

Figure 3:
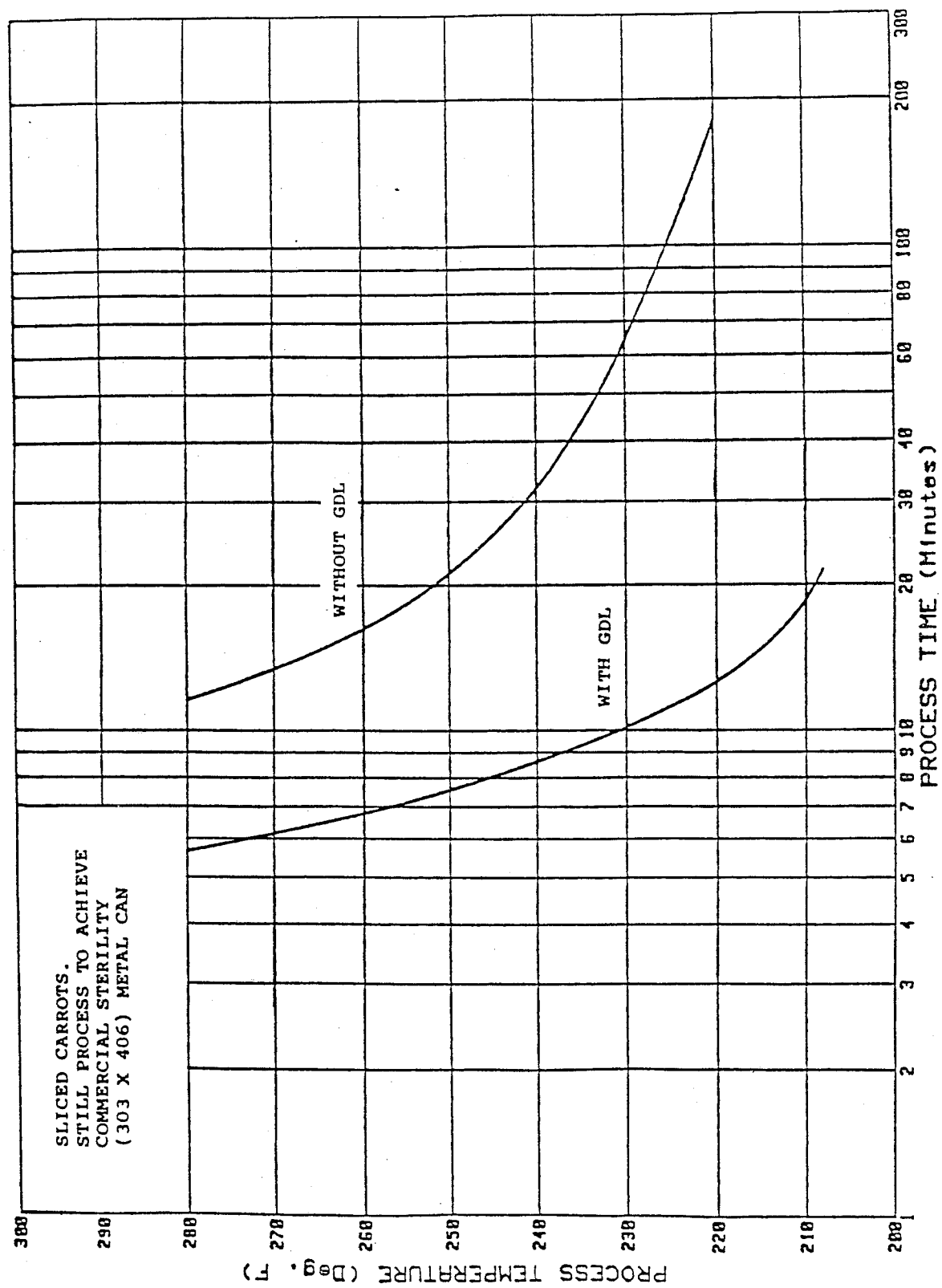

FIG. 3 shows the shift to the left of a still retort processing parameter for thermally sterilizing carrots, from the curve to the right at an $F_o$ of 3.5 without GDL, to the curve at the left, calculated to achieve a CCT of 205° F., which for this product would be equivalent to a calculated $F_o$ of 0.01.

Example 3A

Whole carrots were peeled in a two-step operation, consisting of exposure to high pressure steam followed by a boiling water dip. The carrots were then sliced to a maximum thickness of 3/8".

Cans were hand-filled and check weighed for a 10.4 oz. fill weight. The brine for the GDL Sample cans of Table IIIA below was made by adding 147.6 grams of GDL to six gallons of a 1.5% by weight salt solution. The brine for the Reference Sample cans was a 1.5% by weight aqueous salt solution. The temperature of both brines was about 180° F.

The cans were hermetically sealed. The GDL sample cans of this example were thermally processed in accordance with the invention to achieve commercial sterilization in a still retort at 220° F. for fourteen minutes. The cans for the Reference Sample were thermally processed in a continuous non-agitating retort at 255° F. for nineteen minutes (see Table IIIA below where the properties of the resulting products were the same as stated in Table III).

TABLE IIIA

|  | Reference Sample | GDL Sample |
|---|---|---|
| Thermal processing temperature, °F. | 255 | 220 |
| Thermal processing time, minutes | 19 | 14 |
| pH of carrots in the can | 5.3 | 4.4 |

Color for the two carrot products was measured by Hunter Colorimetry after passing each of the products separately through a blender. The GDL Sample carrots of Example 3A were 12% lighter and more orange in color (redness and yellowness are both higher) than the carrots of the Reference Sample, Table IIIB.

TABLE IIIB

| Code | Hunter Colorimetry Values* | | |
|---|---|---|---|
|  | L | a | b |
| GDL Sample | 55% | 33.0 | 29.0 |

TABLE IIIB-continued

| Code | Hunter Colorimetry Values* | | |
|---|---|---|---|
| | L | a | b |
| Reference Sample | 43% | 29.1 | 28.2 |

*L = lightness (0% = black, 100% = white)
a = redness/greenness (+ = red, 0 = grey, − = green)
b = yellowness/blueness (+ = yellow, 0 = grey, − = blue)

Example 4

Freshly harvested asparagus spears were washed and cut into four inch spear tips (hereafter referred to as spears). The washed spears were hand-packed into perforated metal boxes and blanched for three minutes in water at 180° F. followed by a cold water rinse to terminate the blanch. A series of cans (211×400) were filled with the blanched spears (6.1 oz. fill weight). An aqueous brine solution of 1% by weight GDL, 0.3% by weight citric acid and 1% by weight salt, heated to 180° F. was added to each can to lower the equilibrium pH of the contents to below 4.6, namely to 4.3. Because it is difficult to reduce the equilibrium pH of spears to below 4.6 due to the high buffering capacity (high resistance to changes in pH) of the asparagus tips, the 0.3% citric acid was used with the GDL in the brine solution to increase the ability of the GDL to counteract the buffering capacity of the asparagus. An aqueous solution containing 1% by weight salt, heated to 180° F., was added to other such cans to comprise the Reference Sample cans shown in Table IV. This solution did not include GDL or citric acid. All of the cans were hermetically sealed and thermally processed. The cans containing the GDL (GDL Sample cans, Table IV) were thermally processed in accordance with this invention to achieve commercial sterilization in a still retort at 220° F. for thirteen minutes (spear tips up). The texture of the resulting thermally processed asparagus spears was firm and their physical integrity was maintained, in contrast with the Reference Sample spears conventionally processed without GDL at 248° F. for twenty-three minutes (spear tips up), which were softened and fragmented. Color was comparable to the Reference Sample. The overcooked taste present in the Reference Sample spears was eliminated in the spears processed with GDL.

Figure 4:
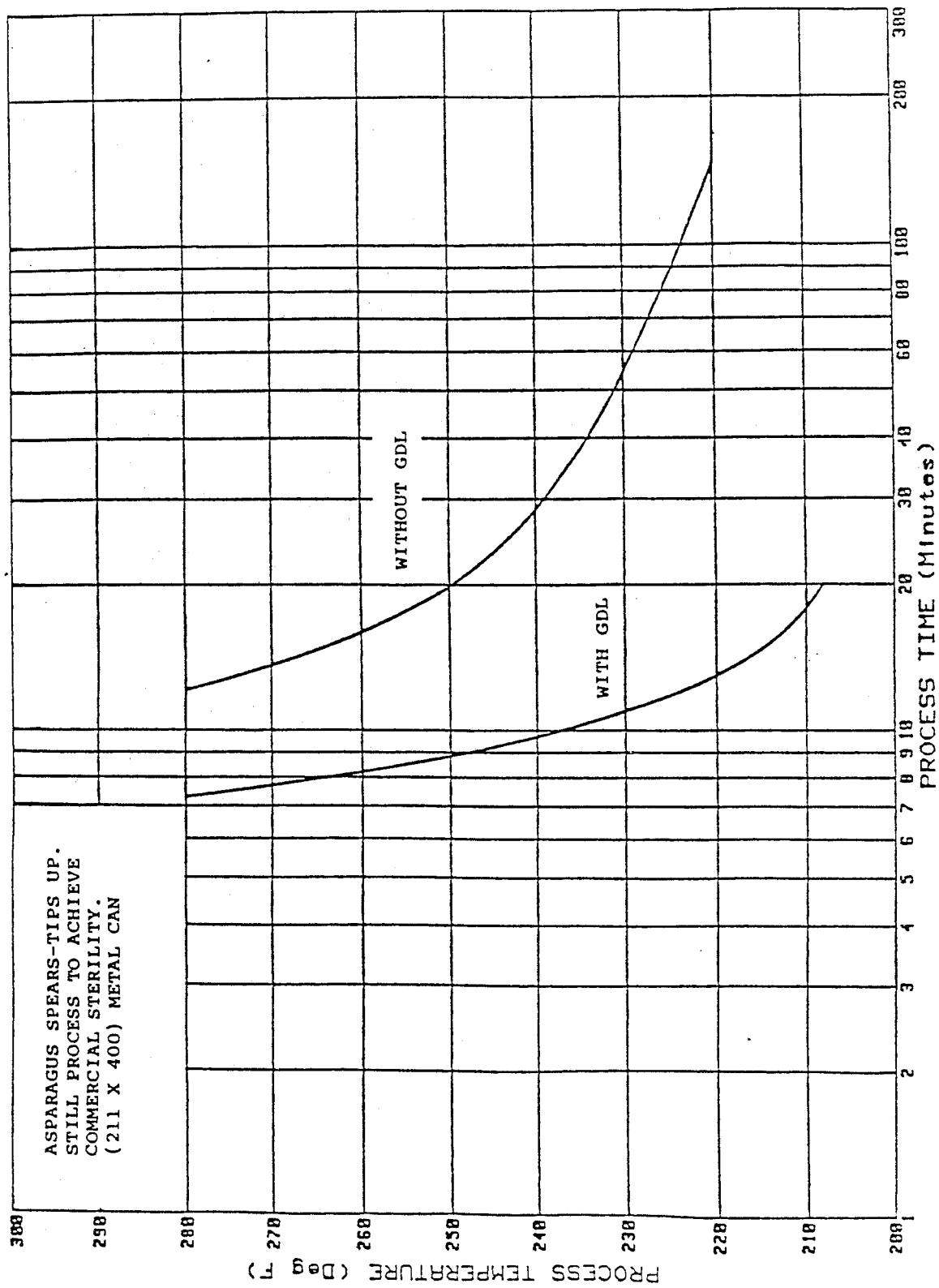

This Example further demonstrates that in accordance with this invention, the addition of GDL to the asparagus spears permits a reduction in the severity of the thermal process to achieve commercial sterilization. The scope of the change can be appreciated by referring to FIG. 4 which shows the shift to the left of a still retort thermal processing parameter curve to achieve commercial sterilization of the asparagus spears, the shift being from the right curve figured at an $F_o$ of 2.8 without GDL, to the curve (to the left) calculated to achieve a CCT of 205° F., which for this product would be equivalent to a calculated $F_o$ of 0.01.

TABLE IV

| | Reference Sample | GDL Sample |
|---|---|---|
| Thermal processing temperature, °F. | 248 | 220 |
| Thermal processing time, minutes | 23 | 13 |
| pH of asparagus spears in the can | 5.5 | 4.3 |
| Texture (canned product) | "Mushy"; Fragmented | Firm; Whole |
| Color (canned product) | Olive Green | Olive Green |
| Flavor | Overcooked | Mildly |

TABLE IV-continued

| | Reference Sample | GDL Sample |
|---|---|---|
| | | Acidic |
| Brine clarity (drained) | Cloudy | Clear |

Figure 4A:
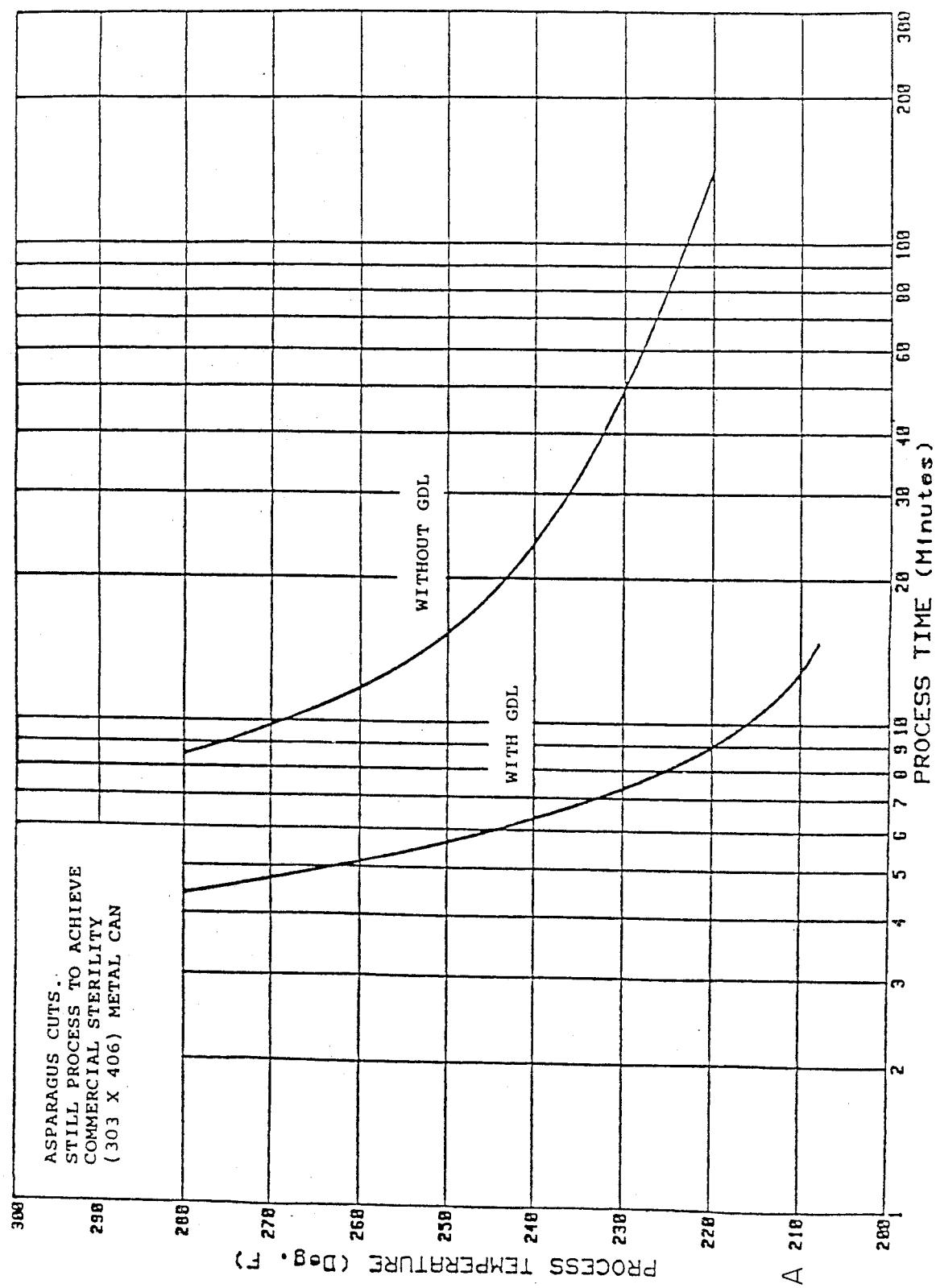

FIG. 4A shows the shift to the left of a still retort thermal processing parameter curve to achieve commercial sterilization of asparagus cuts (1½" long cuts taken along the spears, some cuts of which included tips), the shift being from the right curve figured at an $F_o$ of 2.8 without GDL to the curve (to the left), calculated to achieve a CCT of 205° F., which for this product would be equivalent to a calculated $F_o$ of 0.005.

Example 5

Cauliflower, washed and cut into florets of about two inches long or less, was steamed-blanched for three minutes at 200° F. and rinsed with cold water to stop the blanch. Twenty-six grams of GDL and forty-four grams of salt were added to one gallon of water and heated to 130° F. to form a brine. A series of cans were filled with the blanched cauliflower florets (9 oz. fill weight) and the heated brine was added thereto. The GDL lowered the equilibrium pH to below 4.6, namely to 4.4.

Reference Samples were not prepared because the organoleptic properties of conventionally thermally processed cauliflower are so poor as to make any comparison therewith unnecessary. It is to be noted that cauliflower is one of the foodstuffs which is not commercially canned.

The cans were hermetically sealed and thermally processed in accordance with this invention to achieve commercial sterilization in a still retort at 220° F. for four minutes. The texture of the resulting processed cauliflower florets was very firm and close to that of the fresh home-cooked cauliflower and superior to that of the frozen home-cooked product. The physical integrity of the florets was maintained relative to the cauliflower prior to blanching. The flavor was near home-cooked. With respect to color, the florets were white upon opening of the container twenty-four hours after thermal processing. However, florets packed in containers which were processed as above and opened after two weeks of storage exhibited a slightly pink color. This is believed attributable to trace quantities of metal (e.g. iron) picked up by the product from equipment during the product's handling and processing prior to being filled in the container, or from the container during thermal processing or during storage. The addition of a chelating agent such as EDTA (ethylenediamine tetraacetic acid) inhibits the pink discoloration. The clarity of the brine (drained) was clear.

Figure 5:
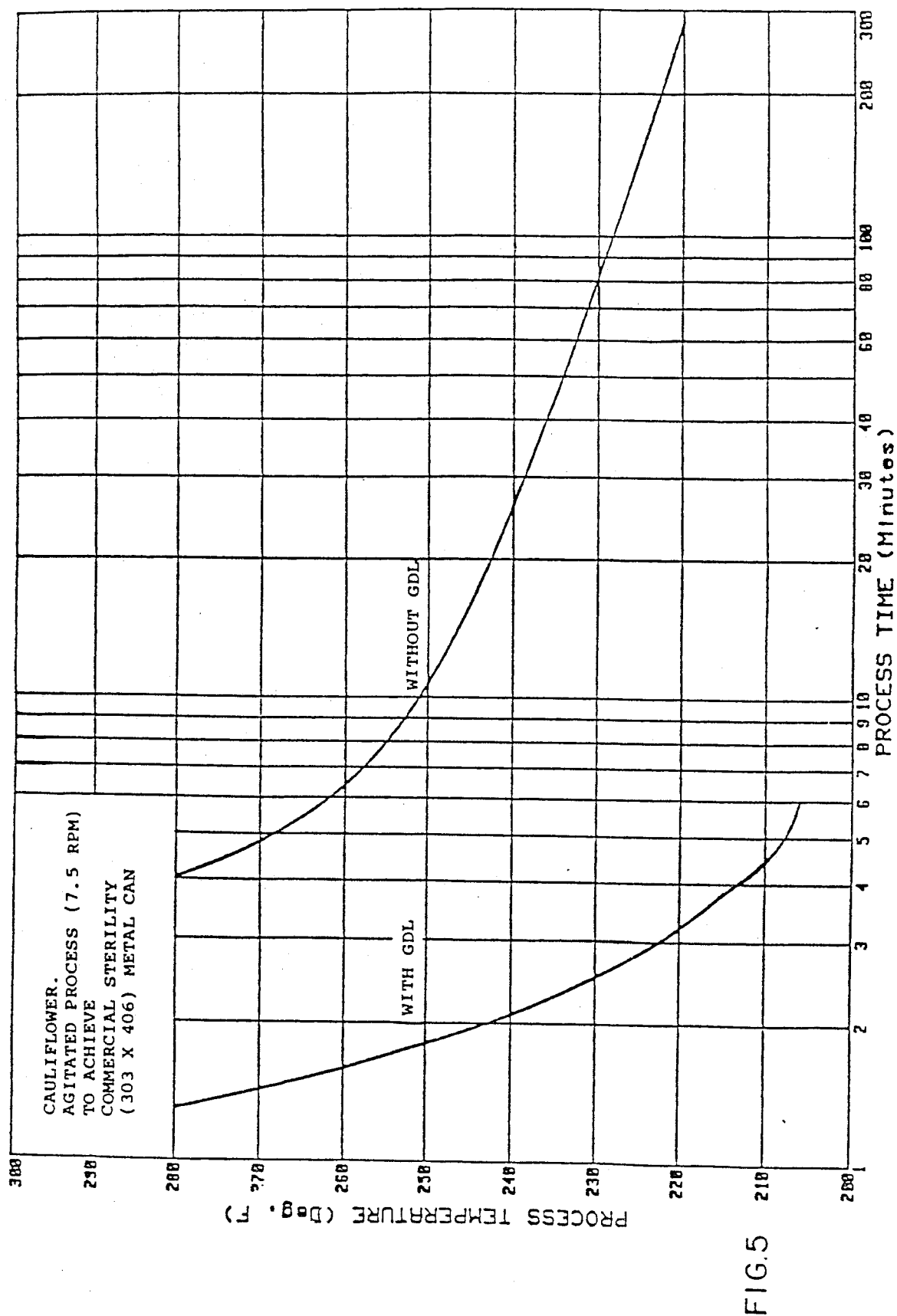

FIG. 5 shows the shift to the left of a continuous agitated retort (7.5 RPM) thermal processing parameter curve to achieve commercial sterilization of the cauliflower florets, the shift being from the right curve figured at an $F_o$ of 6.0 without GDL, to the curve (to the left) calculated to achieve a CCT of 205° F., which for this product would be equivalent to a calculated $F_o$ of 0.003.

Example 6

Freshly harvested sliced yellow squash was washed, cut, blanched and filled into 211×215 multi-layer rigid plastic containers in the manner previously described for Example 1 except that a 5 oz. fill-weight was employed. A brine solution was formed by adding 25.5 grams of GDL and 35 grams of salt to 3 liters of water and heated to 180° F. The cans were filled with the brine solution at about 180° F. and the resulting contents had an equilibrium pH of less than 4.6, namely 4.2. The cans were hermetically sealed and thermally processed in accordance with this invention to achieve commercial sterilization in a still retort at 220° F. for fifteen minutes. The resulting thermally processed yellow squash exhibited the same characteristics as the yellow squash thermally processed in accordance with Example 1 which characteristics are shown in Table 1. These plastic containers or cans were multi-layer polymeric structures comprising an interior layer of a moisture sensitive oxygen barrier polymer, exterior layers of a structural polymer, and intermediate layers of an adherent polymer between the interior and exterior layers, the intermediate layers containing a drying agent, such as disclosed in U.S. Pat. No. 4,407,897.

Figure 6:
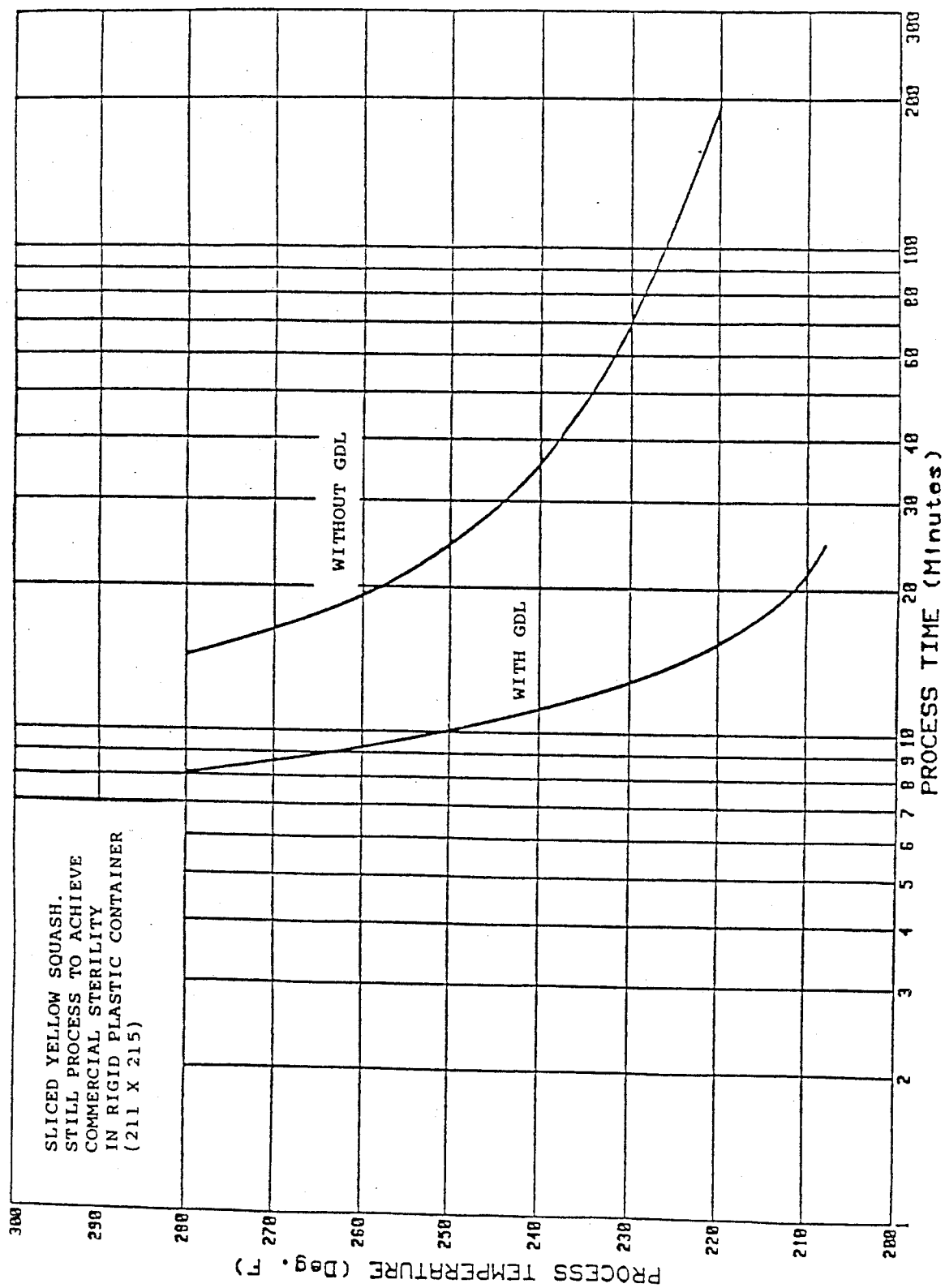

FIG. 6 shows the shift to the left of a still retort thermal processing parameter curve to achieve commercial sterilization of sliced yellow squash, the shift being from the right curve figured at an $F_o$ or 3.7 without GDL, to the curve (to the left) calculated to achieve a CCT of 205° F., which for this product would be equivalent to a calculated $F_o$ of 0.01.

Despite many previous attempts to thermally process and can cereal grains, for example, rice, these attempts have largely been unsuccessful because the kernels tend to agglomerate. The cooked rice tends to adhere to the can and render its removal difficult. Also, the rice tends to discolor, i.e. become brown due to the severe conditions exerted upon it inside the container during thermal processing. Also for three-piece cans (having a side seam) the rice tends to discolor adjacent to the side seam. A further problem is that the rice tends to develop off-odor and off-flavor notes due to the severe thermal processing conditions necessary to commercially sterilize the rice.

It has been found that in accordance with this invention wherein the thermal processing conditions are significantly reduced, most of the aforementioned problems are significantly reduced or eliminated. The following is an example of tests done with plain rice.

Example 7

Two types of plain rice, long grain (enriched) and Cal Rose, respectively, were separately packed in 303×406 two-piece metal cans as follows: 150 grams of each type of the untreated (not parboiled or pre-cooked) dry rice was coated with 15 milliliters of vegetable oil and filled into the cans. Oil was added to prevent the rice grains from initially adhering to one another and to prevent agglomeration during thermal processing and storage. The oil also facilitated removal of the rice from the cans. A 75 grain salt tablet was added to each of the cans. To the containers filled with the long grain rice there was added 175 milliliters of a 1% by weight GDL aqueous brine solution and to the other cans, filled with the Cal Rose rice, there was added 150 milliliters of a 1% by weight GDL aqueous brine solution. Each brine solution was at room temperature, 70°-80° F. All containers were hermetically sealed and thermally processed in accordance with this invention at 215° F. for twenty minutes in a continuous agitated retort (Steritort) (using a 4 RPM reel speed) to achieve a CCT of 205° F. The 1% GDL brine solution provided the contents in the container with an equilibrium pH below 4.6, namely 4.5 for the containers having long grain rice and 4.34 for those having the Cal Rose rice. An agitated retort process was employed to achieve a uniform distribution of pH values of the product from the top to the bottom of the containers. Agitation has an advantage over stationary processing since it equalizes the pH and prevents differences in pH between that at the top and that at the bottom of the can.

With respect to measuring the pH of the rice contents, because the commercially sterilized rice was quite dry, it was necessary to add 1 milliliter of water for each gram of rice to obtain a paste. More particularly, an equal weight of distilled water which had a pH of 5.94 was added to an equal weight of rice. The pH of the rice would have tended to be higher without the distilled water. Using the distilled water, the pH had a minimum of 0.1 unit of safety included. This safety factor was derived by experimentation wherein when GDL solutions in the 1% by weight range were cut 1:1 with distilled water, having a pH of 5.69, there was a 0.14 to 0.15 pH unit rise in the diluted solution.

The resulting thermally processed plain rice products (both types) were loose packs, easily removed from the cans. The grains of rice were not agglomerated. The flavor and color were like the home-cooked rice product. The rice was not discolored.

This invention is not only applicable to plain rice but is also applicable to cereal grain-based foodstuffs, e.g. formulated rice foodstuffs such as fried rice and Spanish rice. In the case of fried rice, plain rice is combined with other food ingredients such as celery, eggs, shrimp, bacon, onions, soy sauce and other flavorings, and in the case of Spanish rice it is combined with a tomato-based sauce which in turn may include green peppers, onions, meat, etc. It has been found that for such rice formulations it is desirable to employ with the GDL a small amount of citric acid to counteract the buffering action of the non-rice ingredients in the formulation to assure achievement of an equilibrium pH of 4.6 or below.

Example 8

Whole Red Rose potatoes (about 1″ to 1½″ diameter, i.e., small) were washed, peeled and filled into metal containers to a fill weight of from 290-300 grams. A 75 grain salt tablet was added to each can and then 200 milliliters of an aqueous brine solution containing 1% GDL by weight was added to each can. The brine was at room temperature, 70°-80° F. As a result, the equilibrium pH of the contents was below 4.6, namely, 4.3. The cans were hermetically sealed and thermally processed in an agitated retort (Steritort) (4 RPM) at 215° F. for nineteen minutes. Whereas the texture of the resulting thermally processed potatoes was firm and comparable to properly home-boiled potatoes, the texture of small peeled potatoes conventionally thermally processed, bought off the shelf for comparison, was mealy. While the color of the GDL-processed potatoes was white, that of the commercially purchased potatoes was off-white. The brine of the GDL processed potatoes was clear, whereas that of the purchased potatoes was pale yellow. While the flavor of the former was close to that of home-boiled Red Rose potatoes, that of the purchased potatoes was not.

It is preferred to utilize the process of this invention with peeled rather than unpeeled potatoes. It has been found that when the potatoes are unpeeled, the skins tend to be a barrier to acidification and to lowering of the equilibrium pH to 4.6 or below.

In one test it was found that unpeeled Red Rose potatoes (small) when treated with the above-mentioned brine remained undesirably at an equilibrium pH above 4.6 for over twenty-four hours. Further, the equilibrium pH of the potatoes and brine was not reached within a period of seven weeks. It will be understood, that in accordance with this invention, GDL acidification of potatoes may be sufficiently rapidly obtained using new small potatoes having immature skins. Perforation or abrasion of the skins of unpeeled potatoes may also help.

The present invention has been applied successfully with respect to extremely heat-sensitive foodstuffs. For example, melons are extremely heat-sensitive particularly in terms of texture, color, odor and flavor and although presently available in frozen form, previous attempts to thermally sterilize and to can melons have proven unsuccessful. Conventional thermal sterilization parameters are quite severe relative to extremely heat-sensitive vegetables such as melons and, for example, in the case of cantaloupe, conventional parameters cause the cataloupe to become mushy in texture, substantially darkened in color and the flavor is altered and is unacceptable. However it has been found that in accordance with this invention wherein the thermal processing conditions are significantly reduced, the aforementioned problems are significantly reduced or eliminated. The following are examples of tests done with cantaloupes as example of extremely heat-sensitive foodstuffs.

Example 9

Fresh cantaloupes were cut into balls and 300 grams of the balls were filled into metal cans. 50 grams of dry cane sugar was filled into each can resulting in a final Brix value of 18°–19°. 130 milliliters of an aqueous brine solution containing 1% by weight GDL and 0.5% by weight citric acid was added to each of the containers. The GDL-containing brine solution reduced the equilibrium pH of the contents to 4.6 or below, namely 4.3. The containers were hermetically sealed and thermally processed in accordance with this invention at 215° F. for ten minutes in an agitated retort (Steritort) (using 4 RPM reel speed) to achieve a CCT of 205° F. The texture was acceptable although slightly softened, and it was close to that of the fresh product. The color was like the fresh product. Although there was some loss of aroma and flavor relative to the fresh product, both the flavor and aroma were acceptable although slightly suppressed. The flavor was sweeter than the fresh product due to the high amount of sugar added.

Example 10

Fresh cantaloupes were cut into chunks and 300 grams of the chunks were filled into metal cans. 160 milliliters of a solution comprised of 24% dry cane sugar, 1% GDL and 0.5% citric acid (by weight in water) were added to each can. The final Brix value was 12°–13°. To one liter of this solution there was added 1.5 milliliters of a natural cantaloupe flavoring which had the trade designation No. 135-31492, SP: 57F, T-3404 dated Nov. 20, 1984, which is sold by International Flavors & Fragrances Inc. The addition of this solution at room temperature (70°–80° F.) to the filled cans lowered the equilibrium pH of the contents to below 4.6, that is, to within the range of from 4.3 to 4.4. The containers were hermetically sealed and thermally processed in accordance with this invention at 215° F. for ten minutes in an agitated retort (Steritort) (using 4 RPM reel speed) to achieve a CCT of 205° F. The texture was acceptable although slightly softened and it was close to that of the fresh product. The color was like that of the fresh product. Aroma and flavor were improved over Example 9, that is, they were acceptable and close to the fresh product.

Example 11

Example 10 was repeated except for the absence of any natural cantaloupe flavoring; the results were the same as in Example 10 except that the aroma and flavor were slightly suppressed.

Corrosivity Test

To test for corrosivity of GDL (i.e. gluconic acid provided by hydrolysis of GDL) vs. vinegar in metal cans, fresh carrots were peeled and washed, and stored overnight at about 40° F. The following day the slices were blanched in water at about 190° F. for four minutes before being added to metal cans. Each can had a fill weight of ten ounces. A 75 grain salt tablet was then added to each can.

A brine for the GDL variable was made by adding 27.0 grams of GDL to three liters of hot water. A brine for the vinegar variable was made by adding 360 ml. of distilled white vinegar to three liters of hot water. The cans were hermetically sealed under 7" mechanical vacuum.

The control cans were processed at 240° F. for thirty minutes. The GDL and vinegar variables were given a reduced process of about 220° F. for eleven minutes (see Table V).

All cans were stored at ambient temperature. Later, after nearly ten months of storage, the sample contents were subjected to an iron analysis by atomic absorption. The results are listed below, Table V. It is to be noted that an iron pick-up greater than 20–25 ppm is considered by those skilled in the art to be excessive.

TABLE V

|  | Control | Vinegar | GDL |
|---|---|---|---|
| Thermal processing temperature, °F. | 240 | 220 | 220 |
| Thermal processing time, minutes | 30 | 11 | 11 |
| Storage time, months | 10 | 10 | 10 |
| Storage temperature, same room | ambient | ambient | ambient |
| pH | 4.94 | 4.39 | 4.02 |
| Fe in carrot product (ppm) | 4.85 | 35.3 | 10.18 |

Visual analysis of the cans confirmed the iron analysis. The can employing the GDL variable had only shallow pitting of the metal container walls in the headspace area. The can employing the vinegar variable had widespread and deeper pitting in the same area. No evidence of corrosion was seen on the control can.

Thus, another advantage of the invention is reduced corrosion of a metal can when employing GDL to reduce thermal processig parameters.

The Examples presented herein have been specifically in terms of several low acid, heat-sensitive vegetables which are not presently marketed or, if so, could have broader marketability or which have limited or no commercial popularity or application from the standpoint of a can (container) on the store shelf. These procedures and results can be extrapolated by those skilled in the art to other low acid vegetables which would lend themselves to being thermally processed in accordance with the present invention, for example to other squashes, and to pumpkin, eggplant, peppers, stir-fry and Chinese vegetables, cabbage, artichokes, celery, beans (including lima, kidney, snap beans, e.g. blue lake, green, wax), snap bean products (e.g. bean salads), dried bean products (including baked beans, chili), mushrooms, corn, olives, onions, peas, and beets. By the same token, the invention is applicable to soups, stews, non-bakery unleavened pasta products and other foodstuffs containing low acid vegetables.

Example 12

Dry elbow macaroni having an overall length of about ⅜ inch, a diameter of about ⅛ inch, and an initial moisture content of 12.3%, was blanched 10 minutes in water at 190°–200° F. to increase the moisture content to approximately 50%, and rinsed in cold water to terminate the blanch. 28 grams of GDL and 40 grams of sodium chloride were added to 4 liters of water (0.7% GDL and 1.0% salt solution) and heated to about 190° F. A series of metal cans (300×407) was packed with the blanched macaroni (fill weight 6 oz.). Some cans were filled with the GDL/salt solution at about 160° F., such that the equilibrium pH of their contents was less than 4.6, more particularly, an average of about 4.2 (GDL Sample Cans). Other cans of the series (Reference Sample cans) were filled with a 1.0% salt solution at the same temperature. All cans were hermetically sealed and thermally processed in a still retort. The processing conditions and a comparison of the resulting thermally sterilized products are shown in Table VA below:

TABLE VA

|  | Reference Sample | GDL Sample |
| --- | --- | --- |
| Thermal Processing Temperature, °F. | 250 | 220 |
| Thermal Processing Time, Minutes | 20 | 9 |
| pH of Macaroni in the Can | 6.4 | 4.2 |
| Texture (Canned Product) | Pasty, Gummy, Flaccid | Firm, Resilient |
| Color (Canned Product) | Grayish | White |
| Flavor (Canned Product) | Overly Starch-like; Overcooked | Near Home-Cooked; No Acid Flavor Noted |

Figure 6A:
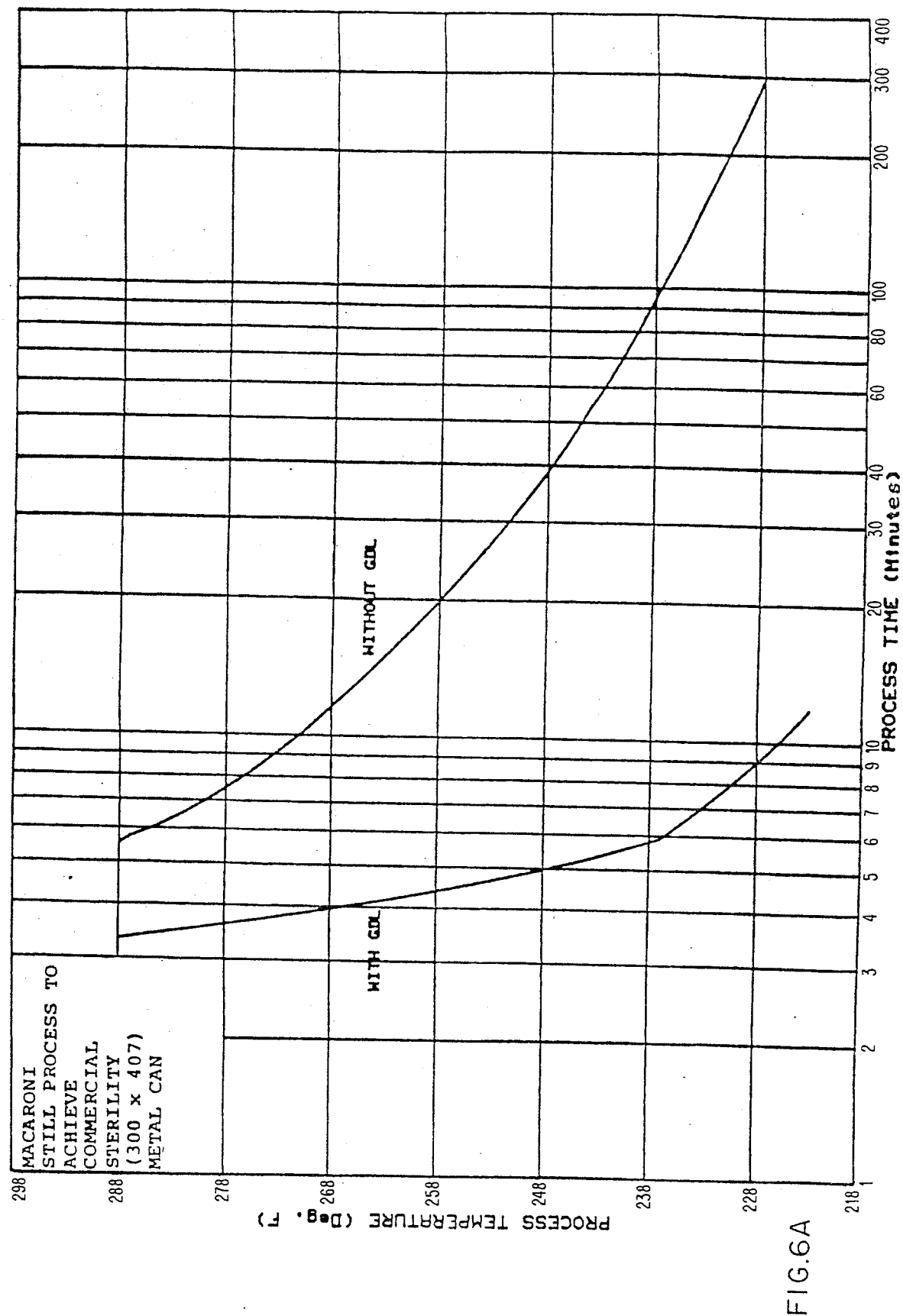

Example 12 and Table VA demonstrate that macaroni thermally processed in accordance with this invention exhibits improved texture, color, and flavor properties as compared to macaroni samples produced without GDL, and permits a reduction in the severity of the thermal process to achieve commercial sterilization. The scope of the change can be appreciated by referring to FIG. 6A which shows the shift to the left of a still retort thermal processing parameter curve to achieve commercial sterilization of macaroni, from the curve to the right figured at an $F_o$ of 6.0 without GDL, to the curve to the left, calculated to achieve a CCT of 205° F., which for this product would be equivalent to an $F_o$ of 0.01.

Example 12 and Table VA show that this invention is applicable to pasta products, that is, to pastas themselves, e.g. macaronis, noodles, spaghetti and linguini, and to pasta products which are combinations of pasta with one or more other foodstuffs, such as vegetables, tomatoes, cheeses, meats, poultry, seafood (e.g. lasagna, spaghetti and meat balls, macaroni and cheese, raviolis, pasta salads, shrimp salads), with or without sauces or other flavoring ingredients or dressings. For example, it is believed that thermal sterilization at reduced parameters of combinations of pasta with vegetables can easily be effected since the equilibrium pH of many of these vegetables has individually been reduced to 4.6 or below for example with brines comprised of from about 0.5 to about 1% GDL, and commercial sterility with improved organoleptic qualities for these respective foodstuffs have been achieved at reduced parameters characteristically achieved with this invention.

Figure 7:
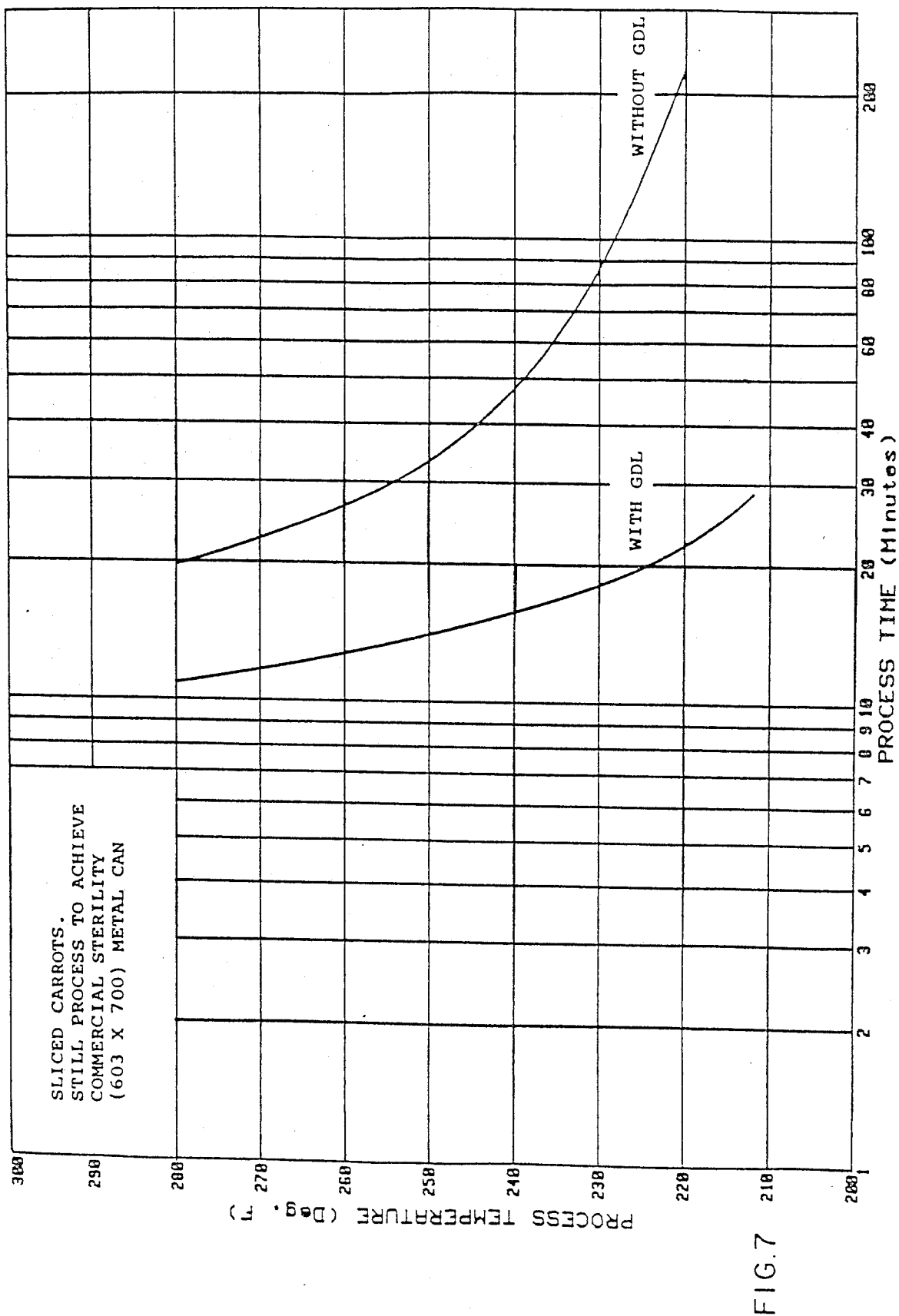

An advantage of the method of this invention is that it enables foodstuffs to be thermally sterilized in large sized containers without substantial loss of process quality. Heretofore, when low acid foods were thermally processed in large institutional size containers such as 603×700, the quality was reduced relative to that of the foods in smaller can sizes due to the longer thermal processing time required for heat penetration to the center of a large can to meet the requirement for commercial sterility. However, in accordance with the methods of this invention, it is possible to thermally sterilize foodstuffs in such larger containers at lower parameters which provide improved quality. FIG. 7 shows two still retort thermal processing parameter curves to achieve commercial sterilization of sliced carrots in 603×700 metal cans. The right hand curve is figured at an $F_o$ of 4.2 without GDL, while the left hand curve is calculated to achieve a CCT of 205° F., which for this product would be equivalent to a calculated $F_o$ of 0.012. By comparing FIG. 3 with FIG. 7, and by reference to Table VI below, it can be seen that with larger can sized, both curves shown in FIG. 7 move to the right in going from FIG. 3 to FIG. 7, and therefore longer times would be necessary to thermally sterilize a food product at a given temperature. The right-hand curve in FIG. 7 (i.e. without GDL) at lower temperatures moves much further to the right than the left-hand curve, and therefore it can be seen that the addition of GDL has particular benefit in retaining product quality in the larger can sizes.

Table VI provides data taken from FIGS. 3 and 7 and shows, for example, that at a retort temperature of 220° F., whereas the processing time of conventionally canned carrots (i.e. without GDL) increases by 46 minutes in going from a 303×406 can to a 603×700 can, if GDL is combined with the carrots, the processing time only increases 9 minutes. The differences in processing time becomes less as the processing temperature increases since at the higher temperatures, all processing times become shorter.

TABLE VI

| | Sliced Carrots in Brine | | |
| --- | --- | --- | --- |
| | Process Time in Minutes | | |
| | Can Size | | Time |
| | 303 × 406 | 603 × 700 | Difference |
| At 220° F. Retort Temp. | | | |
| Without GDL | 181 | 227 | +46 |
| With GDL | 13 | 22 | +9 |
| At 230° F. | | | |
| Without GDL | 85 | 87 | +22 |
| With GDL | 10 | 18 | +8 |
| At 260° F. | | | |
| Without GDL | 16 | 27 | +11 |

TABLE VI-continued

Sliced Carrots in Brine

| | Process Time in Minutes | | |
|---|---|---|---|
| | Can Size | | Time |
| | 303 × 406 | 603 × 700 | Difference |
| With GDL | 7 | 13 | +6 |

Another advantage of this invention is that the acidulant of this invention is effective for controlling, that is preventing, inhibiting, retarding or reversing the discoloration of certain low acid foodstuffs, especially some fruits, vegetables and cereal grains, especially those such as potatoes whose color deteriorates due to enzymatic and/or oxidative reaction. The fresh appearance and natural color can be maintained by combining these foodstuffs with the acidulant of this invention, preferably as a dilute aqueous solution of a mixture of an aldonic acid and its lactones.

The principal manifestation of the activity of the acid is that the foodstuff does not discolor, and in some cases if a color has already developed, the color will reverse. The word "combined" is used herein in a broad sense to encompass treatments such as aqueous sprays, dips, washings, blanching, and soaking as well as such treatments as combining the foodstuffs in containers with syrups, or with brines comprising dilute solutions of the selected aldonic acid and its lactones.

The invention, as will be explained more fully hereinafter, is especially useful for controlling discoloration of various forms of potatoes. However, it can be employed with a number of common fruits, vegetables and cereal grains which have compositions and undergo reactions similar to potatoes.

This invention should not be limited by its theory of operation. However, a possible explanation of the apparent unique ability of the aldonic acids to reduce the pH and assist in the preservation of foodstuffs without imparting an objectionable acid taste is the ability of the acids to form an equilibrium mixture with their lactones in which a large proportion of the mixture is comprised of the lactones. Thus, aqueous mixtures containing the equilibrium mixtures provide a source of acid without at the same time requiring a large amount of acid to be present. The initial source of the acid is the hydrolysis of the lactone. The continued supply of the acid is provided by the equilibrium hydrolysis. The sweet taste of the lactones futher mollifies the aleady mild taste of the acid.

Other acids which have been recommended for this purpose are acetic, propionic, maleic, malic, lactic, tartaric and citric. None of these acids is capable of forming a lactone. Therefore, these other acids tend to impart a sharper taste to foodstuffs than aldonic acids with their lactones, and these acids can contribute a significant acidic taste to the food, especially if used in large amounts.

Treatment with the processing medium of the invention may be effected promptly after harvesting or before, during or after any of the routine food processing techniques such as washing, peeling, slicing, cutting, dipping, soaking or blanching. There may be one treatment or several treatments before the foodstuff is thermally processed. This can be effected while the foodstuff is in a container in a brine of the acid-lactone mixture.

To control discoloration of a foodstuff such as potatoes, it is preferred to contact the potato with the selected acid/lactone, which is usually an equilibrium mixture, promptly after the potato has been peeled, cut, sliced or otherwise treated whereby its cells are exposed to the atmosphere. The reason is that such treatment may sometimes be effective to reverse discoloration or to prevent or inhibit discoloration through the subsequent processing steps. The further the discoloration has progressed, the more difficult it is to reverse it. Thus, with potatoes, it is preferred to treat the freshly peeled potato, most advantageously, as soon after peeling or cutting as possible.

The specific amount of the mixture of the aldonic acids and their lactones which when applied to the foodstuff will be effective to reduce the pH to 4.6 or below and to control discoloration with a specific foodstuff substrate will vary appreciably in accordance with factors well understood by those skilled in the art including size; exposed surface area; time of treatment; the specific foodstuff, e.g., its density and buffering capacity, the length of time it is to be protected and the environment to which it will be exposed. Generally, to control discoloration, it is sufficient to lightly coat potatoes with the active solution, for example by dipping. However, for some foodstuffs or applications, longer exposure may be necessary, for example by soaking the foodstuff or packaging it in a brine containing the mixture.

To control discoloration, it is convenient to employ dilute solutions containing the mixtures at a solids concentration of about 0.1% to 2% by weight, although appreciable variation from this range may be employed without adverse effect. Solutions lower than about 0.5% are generally too dilute to be practically effective. Above about 5%, the solutions are not cost effective. The processing is normally conducted at ambient temperature, i.e. about 50° to 70° F. However, higher temperatures, i.e. above 110° F. and even as high as 180° F. or higher may be employed. The higher temperatures have generally been found useful to reverse discoloration in potatoes. It has been observed that a 1% solution of gluconic acid and its lactones at 180° F. will reverse the discoloration of cut raw potatoes and return them to their natural color.

The following Examples 13 through 16 and their respective Tables will demonstrate the above-discussed effectiveness of the acidulant of this invention in controlling discoloration of representative foodstuffs, potatoes and mushrooms. Examples 14 through 16 will additionally show that the combining of the acidulant with a foodstuff, though preferably effected in the simple, one-step approach of employing it in brine or syrup, can elsewise be advantageously effected in multiple steps, for example by also previously employing the GDL or mixture of aldonic acids and lactones in a (preferably hot) blanching, soaking, dipping or other step.

Example 13

Unblanched peeled and diced Wisconsin potatoes with an average pH of 5.6 were allowed to discolor by exposure to air for 30 minutes and were then hand-filled into metal cans (303×406) to an aim weight of 10.3 ounces. A brine consisting of 0.9% salt containing a small amount of calcium chloride was added to the Reference Sample cans shown in Table VII. For the GDL Sample, a brine was prepared using 0.9% GDL in water heated to 180° F. with a salt and calcium chloride concentrate added to give the same salt concentration as the Reference Sample. The cans were topped, atmospherically hermetically closed and thermally processed in a still retort according to the conditions listed in Table VII. The minimum thermal process to reach a CCT of 205° F. and to achieve commercial sterility at 220° F. for diced potatoes at pH of 4.5 is 7 minutes for a 303×406 can, but a longer (12 minute) cook was used because some previous experiments have shown that the 7 minute cook without blanching may yield an overly crisp, semi-raw potato product.

TABLE VII

|  | Reference Sample | GDL Sample |
|---|---|---|
| Thermal Process Temp. °F. | 250 | 220 |
| Thermal Processing Time, minutes | 15 | 12 |
| pH of Canned Potatoes | 5.6 | 4.5 |
| Texture | Slightly Soft Slightly Slimy Surface | Firm Surface Not Slimy |
| Color | Slightly brownish-white | Yellowish-white |
| Flavor | Cooked potato | Less cooked flavor No obvious acid flavor |
| Brine | Slightly grey | Yellowish-white |

Examination of the canned product showed that the GDL containing brine reversed the discoloration of the potatoes in the cans during the thermal process. The texture of the GDL Sample was superior and firm and there was no noticeable acid flavor. Normally, a sodium bisulfite solution is used to prevent discoloration of diced potatoes prior to canning, but no sulfites were used in preparing either sample in this experiment. Upon standing after opening, the brine of the Reference Samples developed a darker, slightly greyish color compared to the normal, yellowish-white color of the GDL Sample brine.

Example 14

White potatoes of pH 5.6 are peeled and diced and then blanched for 5 minutes at 200° F. to 212° F. in water containing 0.2% GDL to stop enzyme action and prevent discoloration. The pH of the potatoes after blanching is reduced to 5.0 to 5.3. 10.3 ounces of potatoes are filled into metal cans (303×406) and a brine consisting of 0.7% GDL, 0.9% salt and 0.05% calcium chloride is added at 180° F. The cans are topped, atmospherically hermetically closed and thermally processed in a still retort at 220° F. for 7 minutes to reach a can center temperature of 205° F. The cans are cooled and the pH is measured in the range of 4.4 to 4.5.

For comparison, a Reference Sample is prepared using the common commercial procedure of omitting a blanching step but dipping the peeled, diced potatoes in a 0.2% solution of sodium bisulfite to prevent discoloration. The cans are filled first with 10.3 ounces of the dipped potatoes and then filled with a brine of 0.9% salt and 0.05% calcium chloride. The cans are topped, atmospherically hermetically closed, and thermally processed in a still retort at 250° F. for 15 minutes. The reference cans are cooled and the pH is measured in the range of 5.5 to 5.6. The second canned potatoes are stored for one month at room temperature and examined with results shown in Table VIII. The blanched, GDL sample, GDL-acidified potatoes are comparable in good, white color to the Reference Sample and are superior in firmness and texture because of the reduced thermal process. There is no noticeable acid flavor and the GDL acidified potatoes are resistant to after-cooking discoloration in uses such as making potato salads. The good results are achieved without the use of sulfiting agents such as sodium bisulfite that may be harmful to the health of asthmatic persons.

TABLE VIII

|  | Reference Sample | GDL Sample |
|---|---|---|
| Thermal process temp., °F. | 250 | 220 |
| Thermal process time, minutes | 15 | 7 |
| pH of canned potatoes | 5.5–5.6 | 4.4–4.5 |
| Texture | Slightly soft | Firm |
| Color | White | White |
| Flavor | Cooked potato | Less cooked flavor. No obvious acid flavor |

If the GDL Sample of Example 14 is compared to the GDL Sample of Example 13, where there is no blanch or pretreatment with GDL, there may be differences in the quality of the potatoes. The blanching treatment contributes to higher product quality, not only by stopping enzymatic action, but also by helping to retain vitamins and nutrients by stopping their decomposition reactions early in the preservation process. Blanching also helps expel intracellular gases from the product and reduces oxygen in the can headspace, thus slowing oxidative reactions and reducing metal can corrosion. The slight softening of the food in blanching also makes it easier to fill the can to the desired weight.

Compared to the GDL Sample in Example 13, the retort time for the GDL Sample in Example 14 is reduced, from 12 minutes to seven minutes, thus improving throughput or productivity of the retort.

However, blanching may not be desirable for all types and forms of potatoes, the equipment for blanching may not be available, and there are costs associated with blanching such as water costs, energy costs, chemical costs, and losses through leaching of water soluble ingredients in the product. This in turn can generate water pollution costs. Thus, alternatives to blanching with a GDL solution or even hot water should also be considered with canned potatoes, as shown in Example 15.

Example 15

White potatoes of pH 5.6 are peeled and diced and then soaked for at least 5 minutes in cold water containing 0.2% GDL to prevent discoloration. The pH of the potatoes after soaking is reduced to 5.0 to 5.3. 10.3 ounces of potatoes are filled into metal cans (303×406) and a brine consisting of 0.7% GDL, 0.9% salt and 0.05% calcium chloride is added at 180° F. The cans are topped, atmospherically hermetically closed and thermally processed in a still retort at 220° F. for 12 minutes to reach a CCT of 205° F. The cans are cooled and the pH is measured in the range of 4.4 to 4.5.

For comparison, a Reference Sample is prepared using the common commercial procedure of dipping the peeled, diced potatoes in a 0.2% solution of sodium bisulfite to prevent discoloration. The cans are filled first with 10.3 ounces of the dipped potatoes and then filled with a brine of 0.9% salt and 0.5% calcium chloride. The cans are topped, atmospherically hermetically closed, and thermally processed in a still retort at 250° F. for 15 minutes to reach commercial sterility. The reference cans are cooled and the pH is measured in the range of 5.5 to 5.6. The canned potatoes are stored for one month at room temperature and examined with results shown in Table IX.

The GDL acidified potatoes are comparable in good, white color to the Reference Sample and are superior in firmness and texture because of the reduced thermal process. There is no noticeable acid flavor and the GDL acidified potatoes are resistant to after-cooking discoloration in uses such as making potato salads. The good results are achieved without the use of sulfiting agents such as sodium bisulfite that may be harmful to the health of asthmatic persons.

TABLE IX

|  | Reference Sample | GDL Sample |
|---|---|---|
| Thermal process temp., °F. | 250 | 220 |
| Thermal process time, minutes | 15 | 12 |
| pH of canned potatoes | 5.5–5.6 | 4.4–4.5 |
| Texture | Slightly soft | Firm |
| Color | White | White |
| Flavor | Cooked potato | Less cooked flavor. No obvious acid flavor |

It should be understood that various combinations of blanching, dipping, soaking and otherwise contacting the potatoes with a solution of GDL in water prior to thermally processing can be equally as effective in eliminating the use of harmful bisulfites and preventing discoloration as are the specific examples in Examples 13, 14, and 15. For instance, only hot water could be used in the blanch of Example 14, and then a 0.2% GDL dip or soak could be used to provide the additional protection of the acid and allow the lower (0.7%) percentage in the final brine addition. In this case, the thermal process would be 7 minutes at 220° F. to yield the right texture (i.e. firm but not raw). The choice of steps and concentrations will be known to those skilled in the art and will depend for example on availability of equipment and various cost factors and may vary with the variety and form of the potato being canned.

Example 16

Fresh Miranda variety button mushrooms (untreated) were washed and blanched in water for 5 minutes at 190° F. Test 303×406 cans were filled with 304±2 grams of blanched mushrooms and topped with a minimum of 170 grams of approximately 180° F. brine containing 2.5 grams salt, 1.5% GDL and 0.2% citric acid. The salt was added as a flavor enhancer only. The citric acid was used to assist the GDL in reducing the equilibrium pH to below 4.6, namely to 4.0. Because mushrooms have an inherent ability to resist changes in pH due to their high buffering capacity, a relatively small amount of citric acid (0.2% weight in the brine) was used with the 1.5% GDL in the brine solution to increase the ability of the GDL to counteract this buffering capacity.

170 grams minimum of Reference Sample brine with an equal amount of salt (2.5 grams) was added to other similar cans containing equivalent product (304±2 grams) to serve as a Reference Sample. This Reference brine did not contain GDL or citric acid to change the pH.

All the cans were atmospherically hermetically sealed and thermally processed in a still retort. The cans containing the GDL (GDL Sample cans, Table VIII) were thermally processed in accordance with this invention to achieve commercial sterilization in a still retort at 220° F. for twelve minutes. The texture of the resulting thermally processed mushrooms and their physical integrity was maintained in contrast with the Reference Sample mushrooms conventionally processed at 250° F. for 30 minutes which were rubbery, showed some sloughing. Whereas the GDL Sample mushrooms were a desirable off-white color, mushrooms of the Reference Sample were brown in color.

This example further demonstrates that in accordance with this invention, the addition of GDL to mushrooms permits a reduction in the severity of the thermal process, one result of which is less sloughing off of material and less shrinkage of the tissue of the relatively fragile mushroom buttons. This, in turn, leads to higher drained weights. In this test, an 84% weight retention (drain weight relative to fill weight) was found for the GDL samples, and only 82% weight retention for the Reference Sample by comparing the values in Table X to the initial 304±2 g fill weights. (In a subsequent test done with sliced mushrooms, a 96% weight retention was found for the GDL samples, and only 91% weight retention for the Reference Sample). This difference is further substantiated by the finding of particulates in the brine of the Reference Samples, which are not present in the brine of the GDL samples.

TABLE X

|  | Reference Sample | GDL Sample |
|---|---|---|
| Thermal Processing Temperature, °F. | 250 | 220 |
| Thermal Processing Time, minutes | 30 | 12 |
| pH of Equilibrium Mixture | 6.3 | 4.0 |
| Texture (Canned Product) | Rubbery | Firm |
| Color (Canned Product) | Brown | Off White |
| Color (Brine in Can) | Brown with Particulates | Straw Color Clear |
| Appearance (Canned Product) | Slight Sloughing | No Sloughing |
| Flavor (Canned Product) | Earthy, Cooked | Slightly Sour, Slight Suppression of Flavor |
| Drained Weight, grams | 249 ± 1 | 254 ± 2 |

While the GDL samples, whose evaluation is summarized in Table X, has a slight acid flavor at the very low pH of 4.0, the overall organoleptic impression combining the improved texture, light color and absence of sloughing was flavorable. It was judged that in the normal uses of canned mushrooms in soups, casseroles, pizzas, sauces and the like, the slight acid flavor would be obscured and not found objectionable.

A more complete analysis of color was done with a Hunter Colorimeter as shown in Table XI.

TABLE XI

| Hunter Colorimetry Tristimulus Values* | Reference Sample | | GDL Sample | |
|---|---|---|---|---|
|  | Buttons | Brine | Buttons | Brine |
| L | 31 | 43 | 47 | 61 |
| a | 2.4 | 2.6 | 4.2 | −3.5 |
| b | 9.8 | 23.7 | 16.4 | 12.8 |

*L = Lightness
a = Redness (greenness if negative)
b = Yellowness

The solid buttons were finely divided for purposes of testing color. Tristimulus values measured on a Hunter Colorimeter show differences in lightness and chromaticity or hue. The solid product is much lighter and has a different color hue when thermally processed in accordance with this invention with GDL than when the product is commercially processed as a Reference Sample. The GDL solid product is lighter and shows a different color hue, predominantly more yellow, than the Reference sample. The GDL Sample brine is likewise much lighter than the Reference Sample brine and its hue is more pale (straw colored from the mixture of yellow and green) than the brown (red and strong yellow) brine of the Reference sample.

Another advantage of this invention is that it increases the practicality of using still retorts for thermal sterilization to produce good quality canned food on a commercial basis, since still retorts require longer times at equivalent temperatures to reach an equivalent sterilizing value compared to continuous agitating retorts.

As previously demonstrated, this invention is applicable to low acid foodstuffs such as cereal grains, rice, for example, which is heat sensitive in the sense, for example, that it becomes discolored when thermally processed. Cereal grain-based products are deemed susceptible to the thermal process of the present invention, such including fried rice, Spanish rice and other foods which contain rice.

Since GDL is available in the form of a white, crystalline powder, it can be added as such directly to a foodstuff prior to thermal processing. This would apply for example to those foodstuffs wherein the addition of water or brine is undesirable. Hydrolysis of the GDL to gluconic acid and glucono-delta lactone and glucono-gamma lactone would not be as rapid as it would be if water or a previously prepared brine was added.

The GDL employed in the samples of this invention was in the purity grade complying with FAO/WHO standards and USA Food Chemistry Code. FAO designates the Food and Agriculture Organization of the United Nations; WHO designates the World Health Organization. The chemical may be acquired from Pfizer Chemical Co. or Finnsugar, Helsinki, Finland. In some instances, as in the above examples, it may be desirable for taste to add a small amount of salt, sugar or other seasoning, or to modify GDL with a small quantity of an acidulant such as citric acid to increase the buffering capability of the GDL to assure stabilization of the pH of the contents at the desired level. The acidulant added may permit a slight departure from the preferred quantities of GDL set forth above for these products but so long as the pH is reduced to 4.6 or below, and the processing parameter is favorably displaced, with substantially the same results as given above, i.e. without an objectionable acid taste, such modifications amount to the practice of the present invention or the equivalent.

Since the present invention makes possible reduced processing parameters, more product substance and nutrients are retained instead of being lost into the brine during processing and storage.

Steam retorting (either stationary batch, or continuous agitating) is the preferred means of thermal processing low acid foods in accordance with this invention. For processing low-acid foods in a still retort, the preferred temperature range is from about 220° F. to about 260° F. For foods processed in a continuous agitated retort (containers fed in a continuous stream are rotated to achieve agitation) the preferred range is from about 220° F. to about 275° F. However, for this invention, for foodstuffs with an equilibrium pH of 4.6 or below, lower thermal processing temperatures can be employed such that for both still and continuous agitated retorts the preferred temperature range is from about 210° F. to about 230° F. Currently, for these foodstuffs 212° F. is deemed to be the lowest desirable sterilizing temperature from a practical standpoint in a retort. Although the time requirement would be extended, temperatures as low as 205° F. could be used if desired under this invention if adequate controls and safeguards could be developed.

It is to be noted that with respect to each of the examples the initial fill temperature of the contents for both the Reference Sample container and the GDL Sample container were the same. The thermal processes for each curve in each figure were based upon an initial fill temperature of 100° F. It is also to be noted that the figures are merely illustrative (and semi-logarithmic) of the dramatic movement of the parameter to the left under this invention and are not to be used for selection of a particular actual thermal process time and temperature.

The present invention may be employed with respect to any thermal processing technique including gas flame sterilization and aseptic processing. In gas flame sterilization, a foodstuff in a sealed container is sterilized by agitating the container, e.g. by rolling it, as it passes over a gas flame. In aseptic processing and packaging, a commercially sterilized product is filled into a presterilized container and then aseptically and hermetically sealed with a presterilized closure in an atmosphere free of microorganisms. Employing an aldonic acid/lactone mixture such as by combining GDL with the foodstuff to be aseptically processed and packaged should reduce the aseptic process time-temperature parameters needed to achieve commercial sterility.

Although metal cans were employed for most of the examples, the invention is not dependent on this type of container or the material of which it is made. It can be seen from Example 6 that the invention and its advantage of significantly reduced thermal processing parameters can be achieved using suitable rigid plastic containers, single or multiple layer, and it will be readily apparent to those skilled in the art that the invention is also applicable with glass containers, suitable semi-rigid containers and flexible containers such as pouches, with or without foil.

Hence, while preferred embodiments of the invention have been described, it is to be understood these are capable of variation and modification and therefore the invention is not to be limited to the precise details set forth, the invention being broad enough to include such changes and alterations which are equivalent or fall within the purview of the following claims.

What is claimed is:

1. In a method of thermally processing a low acid, heat sensitive foodstuff susceptible to degradation when thermally processed, which comprises:

combining the foodstuff with an hydrolysis mixture of an aldonic acid and its lactones or a precursor thereof in an amount sufficient to lower the equilibrium pH to 4.6 or less and subjecting the combined foodstuff to a thermal process at a reduced time temperature parameter sufficient to achieve commercial sterilization; said parameter being lower than the higher commercial sterilization parameter needed when said hydrolysis mixture of an aldonic acid and its lactones or a precursor thereof is not employed, the improvement which comprises:

in said step of combining, combining the foodstuff with a first portion of said hydrolysis mixture or a precursor thereof in an amount sufficient to control discoloration of said foodstuff prior to thermal processing but insufficient to lower the pH to 4.6 and thereafter; but, prior to thermally processing, combining the foodstuff with a second portion of said hydrolysis mixture of a precursor thereof in an amount sufficient to lower the equilibrium pH to 4.6 or less.

2. The method of claim 1 in which the foodstuff is combined with the first portion of a hydrolysis mixture of an aldonic acid and its lactones or a precursor thereby by blanching the foodstuff with a hot aqueous solution containing said hydrolysis mixture or a precursor thereof.

3. A method as in claim 2 wherein the hydrolysis mixture or precursor thereof is an hydrolysis mixture of gluconic acid and its lactones or a precursor thereof.

4. The method of claim 1 in which the foodstuff is combined with the first portion of the hydrolysis mixture of an aldonic acid and its lactones or a precursor thereof by dipping the foodstuff in an aqueous solution containing said hydrolysis mixture or a precursor thereof.

5. A method as in claim 4 wherein the hydrolysis mixture or precursor thereof is an hydrolysis mixture of gluconic acid and its lactones or a precursor thereof.

6. A method as in claim 1 wherein the hydrolysis mixture or precursor thereof is an hydrolysis mixture of gluconic acid and its lactones or a precursor thereof.

7. The method of claim 1, 2, 4, 6, 3 or 5 wherein the foodstuff is a peeled or cut potato.

8. The method of claim 1, 2, 4, 6, 3, or 5 wherein the foodstuff is mushrooms.

9. A hermetically sealed container containing a commercially sterilized foodstuff thermally processed according to the method of claim 1.

10. In a method of thermally processing a low acid, heat sensitive foodstuff in a container, said foodstuff being susceptible to heat degradation when thermally processed, which comprises:
(a) combining the foodstuff in a container with a hydrolysis mixture of an aldonic acid and its lactones or a precursor thereof in an amount sufficient to lower the equilibrium pH to 4.6 or less,
(b) hermetically sealing the combined foodstuff in said container, and
(c) subjecting the combined foodstuff to a thermal process at a reduced time-temperature parameter sufficient to achieve commercial sterilization; said parameter being lower than the higher commercial sterilization parameter needed when said hydrolysis mixture of an aldonic acid and its lactones or a precursor thereof is not employed, the improvement which comprises:
prior to placing the foodstuff in the container, combining it with a first portion of said hydrolysis mixture or precursor thereof in an amount sufficient to control discoloration of said foodstuff but insufficient to lower the pH to 4.6 and thereafter; but, prior to thermally processing combining the said foodstuff in the container with a second portion of said hydrolysis mixture or precursor thereof in an amount sufficient to lower the equilibrium pH to 4.6 or less, and then conducting Steps (b) and (c).

11. The method of claim 10 in which the foodstuff is combined with the first portion of the hydrolysis mixture of an aldonic acid and its lactones or a precursor thereof by blanching the foodstuff with a hot aqueous solution containing said hydrolysis mixture or a precursor thereof.

12. A method as in claim 11 wherein the hydrolysis mixture or precursor thereof is an hydrolysis mixture of gluconic acid and its lactones or a precursor thereof.

13. The method of claim 10 in which the foodstuff is combined with the first portion of the hydrolysis mixture of an aldonic acid and its lactones or a precursor thereof by dipping the foodstuff in an aqueous solution containing said hydrolysis mixture or a precursor thereof.

14. A method as in claim 13 wherein the hydrolysis mixture or precursor thereof is an hydrolysis mixture of gluconic acid and its lactones or a precursor thereof.

15. A method as in claim 10 wherein the hydrolysis mixture or precursor thereof is an hydrolysis mixture of gluconic acid and its lactones or a precursor thereof.

16. The method of claims 10, 11, 13, 15, 12 or 14 wherein the container is comprised of metal.

17. The method of claims 10, 11, 13, 15, 12 or 14 wherein the container is comprised of plastic.

18. The method of claims 10, 11, 13, 15, 12 or 14 wherein the container is comprised of glass.

19. The method of claims 10, 11, 13, 15, 12 or 14 wherein the container is comprised of metal and wherein the foodstuff is peeled or cut potato.

20. The method of claims 10, 11, 13, 15, 12 or 14 wherein the container is comprised of plastic and wherein the foodstuff is peeled or cut potato.

21. The method of claims 10, 11, 13, 15, 12 or 14 wherein the container is comprised of glass and wherein the foodstuff is peeled or cut potato.

22. The method of claims 10, 11, 13, 15, 12 or 14 wherein the container is comprised of metal and wherein the foodstuff is mushrooms.

23. The method of claims 10, 11, 13, 15, 12 or 14 wherein the container is comprised of plastic and wherein the foodstuff is mushrooms.

24. The method of claims 10, 11, 13, 15, 12 or 14 wherein the container is comprised of glass and wherein the foodstuff is mushrooms.

25. A hermetically sealed container containing a commercially sterilized foodstuff thermally processed according to the process of claim 10.

* * * * *